(12) United States Patent
Yang

(10) Patent No.: US 10,242,646 B2
(45) Date of Patent: Mar. 26, 2019

(54) RGB TO YUV FORMAT CONVERSION AND INVERSE CONVERSION METHOD AND CIRCUIT FOR DEPTH PACKING AND DEPACKING

(71) Applicant: NATIONAL CHENG KUNG UNIVERSITY, Tainan (TW)

(72) Inventor: Jar-Ferr Yang, Tainan (TW)

(73) Assignee: NATIONAL CHENG KUNG UNIVERSITY, Tainan (TW)

( * ) Notice: Subject to any disclaimer, the term of this patent is extended or adjusted under 35 U.S.C. 154(b) by 23 days.

(21) Appl. No.: 15/590,451

(22) Filed: May 9, 2017

(65) Prior Publication Data

US 2017/0323617 A1 Nov. 9, 2017

Related U.S. Application Data

(60) Provisional application No. 62/333,502, filed on May 9, 2016.

(51) Int. Cl.

| G09G 5/02 | (2006.01) |
|---|---|
| G09G 5/06 | (2006.01) |
| G06T 11/00 | (2006.01) |
| H04N 1/60 | (2006.01) |
| H04N 9/64 | (2006.01) |
| H04N 19/80 | (2014.01) |
| H04N 19/59 | (2014.01) |
| H04N 19/46 | (2014.01) |
| H04N 19/70 | (2014.01) |
| H04N 13/00 | (2018.01) |
| H04N 13/139 | (2018.01) |

(52) U.S. Cl.
CPC ............... *G09G 5/02* (2013.01); *H04N 9/646* (2013.01); *G09G 2300/0452* (2013.01); *G09G 2320/0666* (2013.01); *G09G 2340/02* (2013.01); *G09G 2340/06* (2013.01); *G09G 2350/00* (2013.01); *H04N 13/139* (2018.05); *H04N 2013/0081* (2013.01)

(58) Field of Classification Search
CPC combination set(s) only.
See application file for complete search history.

(56) References Cited

U.S. PATENT DOCUMENTS 9,661,340 B2 * 5/2017 Sullivan ................. H04N 19/46
9,979,964 B2 * 5/2018 Shibahara ............ H04N 19/159
(Continued)

*Primary Examiner* — Wesner Sajous
(74) *Attorney, Agent, or Firm* — Muncy, Geissler, Olds & Lowe, P.C.

(57) ABSTRACT

A conversion method includes: obtaining two R's, two G's and two B's sub-pixel values having interleaved positions from four pixels of the RGB format; obtaining four Y-luminance value, one U-chrominance value and one V-chrominance value of the YUV format according to the obtained sub-pixel values. The Y-luminance values of the first, second, third and fourth pixels in the YUV format are calculated from R's of the first pixel, G's of the second pixel, G's of the third pixel and B's sub-pixel value of the fourth pixel respectively. The U-chrominance value of the first pixel is calculated from B's of the first pixel, R's of the first pixel and the G's sub-pixel value of the third pixel. The V-chrominance value of the first pixel is calculated from the R of the fourth pixel, G of the second pixel and B of the fourth pixel.

13 Claims, 26 Drawing Sheets

(56) References Cited

U.S. PATENT DOCUMENTS

| | | | |
|---|---|---|---|
| 2015/0092028 A1* | 4/2015 | Yang | H04N 19/597 |
| | | | 348/55 |
| 2015/0092029 A1 | 4/2015 | Yang et al. | |
| 2015/0092848 A1 | 4/2015 | Yang et al. | |
| 2015/0093020 A1 | 4/2015 | Yang et al. | |
| 2016/0212373 A1* | 7/2016 | Aharon | H04N 19/17 |

* cited by examiner

RGB TO YUV FORMAT CONVERSION AND INVERSE CONVERSION METHOD AND CIRCUIT FOR DEPTH PACKING AND DEPACKING

CROSS REFERENCE TO RELATED APPLICATIONS

The non-provisional patent application claims priority to U.S. provisional patent application with Ser. No. 62/333,502 filed in on May 9, 2016, the entire contents of which are hereby incorporated by reference.

BACKGROUND OF THE INVENTION

Field of Invention

The present invention relates to a conversion and an inverse conversion method and circuit for depth packing and unpacking.

Related Art

Most human visible colors can be presented by mixing red, green and blue (R, G, B). However, the human visual system is more sensitive to luminance and less sensitive to chrominance. Moreover, the color space constructed by the three primary colors can not represent the image intensity (brightness), such as softening, sharpening, and the likes. Besides, the RGB format image data usually occupies a larger bandwidth in transmission and larger memory space in storage. Therefore, it is necessary to transform the RGB format image data into YUV format image data to achieve high efficient image transmission.

In the conventional art, the video or image compression system can convert the adjacent four pixels of the RGB sub-pixels into adjacent four pixels (also known as YUV 444 format) of the YUV sub-pixels before data transmission, and then the receiving end can convert the YUV format image data back to the RGB format image data.

An conventional art is disclosed with reference to FIGS. 11A and 11B. FIGS. 11A and 11B show the conversions of the depth vertical pixels and the depth horizontal pixels. According to what is shown in FIG. 11A and the matrix equation as shown in the following Table 1, excluding the calculated error, the conversion and inverse conversion of the image data between the RGB format and the YUV 444 format does not cause distortion.

TABLE 1

$$\begin{bmatrix} Y_i \\ U_i \\ V_i \end{bmatrix} = \begin{bmatrix} 0.2568 & 0.5041 & 0.0979 \\ -0.1482 & -0.2910 & 0.4392 \\ 0.4392 & -0.3678 & -0.0714 \end{bmatrix} \begin{bmatrix} R_i \\ G_i \\ B_i \end{bmatrix} + \begin{bmatrix} 16 \\ 128 \\ 128 \end{bmatrix}$$
$$i = 1, 2, 3, 4$$

$$\begin{bmatrix} R_i \\ G_i \\ B_i \end{bmatrix} = \begin{bmatrix} 1.1644 & 0.0001 & 1.5960 \\ 1.1644 & -0.3917 & -0.8130 \\ 1.1644 & 2.0173 & 0.0001 \end{bmatrix} \begin{bmatrix} Y_i - 16 \\ U_i - 128 \\ V_i - 128 \end{bmatrix}$$
$$i = 1, 2, 3, 4$$

In addition, according to what is shown in FIG. 11B and the matrix equation as shown in the following Table 2, excluding the calculated error, the conversion and inverse conversion of the image data between the RGB format and the YUV 444 format does not cause distortion.

TABLE 2

$$\begin{bmatrix} Y_i \\ U_i \\ V_i \end{bmatrix} = \begin{bmatrix} 0.2568 & 0.5041 & 0.0979 \\ -0.1482 & -0.2910 & 0.4392 \\ 0.4392 & -0.3678 & -0.0714 \end{bmatrix} \begin{bmatrix} R_i \\ G_i \\ B_i \end{bmatrix} + \begin{bmatrix} 16 \\ 128 \\ 128 \end{bmatrix}$$
$$i = 1, 2, 3, 4$$

$$\begin{bmatrix} R_i \\ G_i \\ B_i \end{bmatrix} = \begin{bmatrix} 1.1644 & 0.0001 & 1.5960 \\ 1.1644 & -0.3917 & -0.8130 \\ 1.1644 & 2.0173 & 0.0001 \end{bmatrix} \begin{bmatrix} Y_i - 16 \\ U_i - 128 \\ V_i - 128 \end{bmatrix}$$
$$i = 1, 2, 3, 4$$

However, in order to achieve high efficient video transmission, in some embodiments, the video or image compression system preserves the four luminance values (Y) of the four pixels of the YUV format, and the four chrominance values (U, V) are processed by subsampling so as to leave only the U, V chrominance values of two pixels (also known as YUV 422 format), or the U, V chrominance values of one pixel (also known as YUV 420 format). Thus, the transmission of image data of YUV422 or 420 format can occupy less bandwidth in transmission and less memory space in storage, thereby achieving high efficient video compression and transmission.

FIGS. 12A and 12B show the YUV444 format, YUV422 format, and YUV420 format of the depth vertical and horizontal packages, respectively. The black UV chroma values are indicated in the two illustrations has been routed by the different sampling. Because the YUV 420 format consumes the least amount of bandwidth and memory, it is the most commonly used format for video or image compression systems.

When the receiving end of the image decompression system receives the YUV420 (or YUV 422) format image data, the lacked U, V chrominance values are filled with the remained U, V chrominance values so as to obtain the approximate YUV444 format image data, which are then converted to the RGB format image data. For example, in the YUV 420 format, the decompression system fills the U chrominance values (U2, U3, U4) of the second pixel, the third pixel, and the fourth pixel, respectively, with the U chrominance value (U1) of the first pixel, and fills the V chrominance values (V2, V3, V4) of the second pixel, the third pixel, and the fourth pixel, respectively, with the V chrominance value (V1) of the first pixel. Then, the four pixels in the YUV format are converted to RGB format. Since the missing U, V chrominance values are filled with the reserved U, V chrominance values, the converted RGB format image data will cause serious distortion at the area having large (or having dramatic difference) depth variations.

The above-mentioned conversion and inverse conversion method for processing the RGB format and YUV format image data in the conventional art have been used by the industry for a long time. Although the parameter values may have a slight change, the conversion and inverse conversion are carried out by the matrix with the three variables (R, G, B or Y, U, V), and are only focused on the transmission efficiency with regardless other factors.

The packing and unpacking technology for the color frame and depth frame (Combined Texture Depth Packing, CTDP) has been disclosed. In this technology, the packed color frame and depth frame can be transmitted together. However, during the compression and transmission of the depth frame, when utilizing the YUV 420 format (or 422 format) to fill the YUV 444 format in the conversion to obtain the RGB format, the positions of the depth frame having large depth variations may have a considerable distortion.

SUMMARY OF THE INVENTION

Accordingly, one objective of the present invention is to provide conversion and an inverse conversion methods and circuits applied to the packing and unpacking a depth frame between RGB and YUV format.

The conversion methods and circuits, as illustrated by some embodiments of the present invention, are different from those conventional methods in that the methods and circuits, as illustrated by some embodiments of the present invention, do not utilize all three variables (i.e., all three sub-pixel values) of the RGB format or YUV format during conversion, but they still have the advantages of high compression rate, small data amount and high transferring efficiencies, as well as to be able to lower the loading to the transmission apparatus and occupy less bandwidth.

Also, compared with the conventional art, the inverse conversion methods and circuits, as illustrated by some embodiments of the present invention, can recover the conversed image data to obtain a better original depth frame and therefore to improves the distortion at the area having large (or dramatic) depth gap.

To achieve the above objective, one embodiment of the invention discloses a method applied in packing a depth frame to convert from RGB format to YUV format. The RGB format includes R subpixels, G subpixels and B subpixels, and the YUV format includes Y subpixels (Y-luminance or Y-Luma), U subpixels (U-chrominance or U-chroma) and V subpixels (V-chrominance or V-chroma). The depth frame in RGB format include at least four adjacent pixels in one group. Of each pixel, the R subpixel, G subpixel and B subpixel are arranged in vertical. These four pixels in each group includes a first pixel, a second pixel, a third pixel, and a fourth pixel. The first pixel is located adjacent to the second pixel and the third pixel, and the fourth pixel is also located adjacent to the second pixel and the third pixel. The method includes the following steps: obtaining two R, two G and two B subpixel values having interleaved positions from the four pixels of the RGB format; obtaining four Y-luminance value, one U-chrominance value and one V-chrominance value of the YUV format according to the obtained two R, two G, and two B subpixel values. Of four pixels in the YUV format, the Y-luminance value of the first pixel in the YUV format are calculated according to the R subpixel value of the first pixel in the RGB format, the Y-luminance value of the second pixel in the YUV format are calculated according to the G subpixel value of the second pixel in the RGB format, the Y-luminance value of the third pixel in the YUV format are calculated according to the G subpixel value of the third pixel in the RGB format, and the Y-luminance value of the fourth pixel in the YUV format are calculated according to the B subpixel value of the fourth pixel in the RGB format. The U-chrominance value of the first pixel in the YUV format is calculated according to subtracting the B subpixel value of the first pixel in the RGB format to an average of the R subpixel value of the first pixel and the G subpixel value of the third pixel in the RGB format. The V-chrominance value of the first pixel in the YUV format is calculated according to subtracting the R subpixel value of the fourth pixel in the RGB format and an average of the G subpixel value of the second pixel and the B subpixel value of the fourth pixel in the RGB format.

To achieve the above objective, one embodiment of the invention discloses a circuit to convert a RGB format to a YUV format applied in packing a depth frame. The RGB format includes R subpixels, G subpixels and B subpixels, and the YUV format includes Y subpixels (Y-luminance or Y-Luma), U subpixels (U-chrominance or U-chroma) and V subpixels (V-chrominance or V-chroma). The depth frame in RGB format include at least four adjacent pixels in one group. Of each pixel, the R subpixel, G subpixel and B subpixel are arranged in vertical. These four pixels in each group includes a first pixel, a second pixel, a third pixel, and a fourth pixel. The first pixel is located adjacent to the second pixel and the third pixel, and the fourth pixel is also located adjacent to the second pixel and the third pixel. The circuit comprises a pixel retrieving unit and a pixel converting unit. The pixel retrieving unit retrieves and obtains two R, two G and two B subpixel values having interleaved positions from the four pixels of the RGB format. The pixel converting unit obtains four Y-luminance value, one U-chrominance value and one V-chrominance value of the YUV format according to the obtained two R, two G, and two B subpixel values. Of four pixels in the YUV format, the Y-luminance value of the first pixel in the YUV format are calculated according to the R subpixel value of the first pixel in the RGB format, the Y-luminance value of the second pixel in the YUV format are calculated according to the G subpixel value of the second pixel in the RGB format, the Y-luminance value of the third pixel in the YUV format are calculated according to the G subpixel value of the third pixel in the RGB format, and the Y-luminance value of the fourth pixel in the YUV format are calculated according to the B subpixel value of the fourth pixel in the RGB format. The U-chrominance value of the first pixel in the YUV format is calculated according to subtracting the B subpixel value of the first pixel in the RGB format to an average of the R subpixel value of the first pixel and the G subpixel value of the third pixel in the RGB format. The V-chrominance value of the first pixel in the YUV format is calculated according to subtracting the R subpixel value of the fourth pixel in the RGB format and an average of the G subpixel value of the second pixel and the B subpixel value of the fourth pixel in the RGB format.

To achieve the above objective, one embodiment of the invention discloses a method applied in packing a depth frame to convert from RGB format to YUV format. The RGB format includes R subpixels, G subpixels and B subpixels, and the YUV format includes Y subpixels (Y-luminance or Y-Luma), U subpixels (U-chrominance or U-chroma) and V subpixels (V-chrominance or V-chroma). The depth frame in RGB format include at least four adjacent pixels in one group. Of each pixel, the R subpixel, G subpixel and B subpixel are arranged in horizontal. These four pixels in each group includes a first pixel, a second pixel, a third pixel, and a fourth pixel. The first pixel is located adjacent to the second pixel and the third pixel, and the fourth pixel is also located adjacent to the second pixel and the third pixel. The method includes the following steps: obtaining two R, two G and two B subpixel values having interleaved positions from the four pixels of the RGB format; obtaining four Y-luminance value, one U-chrominance value and one V-chrominance value of the YUV format according to the obtained two R, two G, and two B subpixel values. Of four pixels in the YUV format, the Y-luminance value of the first pixel in the YUV format are calculated according to the R subpixel value of the first pixel in the RGB format, the Y-luminance value of the second pixel in the YUV format are calculated according to the G subpixel value of the second pixel in the RGB format, the Y-luminance value of the third pixel in the YUV format are calculated according to the G subpixel value of the third pixel in the RGB format, and the Y-luminance value of the fourth pixel in the YUV format are calculated according to the B subpixel value of the fourth pixel in the RGB format. The U-chrominance value of the first pixel in the YUV format is calculated according to subtracting the B subpixel value of the first pixel in the RGB format to an average of the R subpixel value of the first pixel and the G subpixel value of the second pixel in the RGB format. The V-chrominance value of the first pixel in the YUV format is calculated according to subtracting the R subpixel value of the fourth pixel in the RGB format and an average of the G subpixel value of the third pixel and the B subpixel value of the fourth pixel in the RGB format.

To achieve the above objective, one embodiment of the invention discloses a circuit to convert a RGB format to a YUV format applied in packing a depth frame. The RGB format includes R subpixels, G subpixels and B subpixels, and the YUV format includes Y subpixels (Y-luminance or Y-Luma), U subpixels (U-chrominance or U-chroma) and V subpixels (V-chrominance or V-chroma). The depth frame in RGB format include at least four adjacent pixels in one group. Of each pixel, the R subpixel, G subpixel and B subpixel are arranged in horizontal. These four pixels in each group includes a first pixel, a second pixel, a third pixel, and a fourth pixel. The first pixel is located adjacent to the second pixel and the third pixel, and the fourth pixel is also located adjacent to the second pixel and the third pixel. The circuit comprises a pixel retrieving unit and a pixel converting unit. The pixel retrieving unit retrieves and obtains two R, two G and two B subpixel values having interleaved positions from the four pixels of the RGB format. The pixel converting unit obtains four Y-luminance value, one U-chrominance value and one V-chrominance value of the YUV format according to the obtained two R, two G, and two B subpixel values. Of four pixels in the YUV format, the Y-luminance value of the first pixel in the YUV format are calculated according to the R subpixel value of the first pixel in the RGB format, the Y-luminance value of the second pixel in the YUV format are calculated according to the G subpixel value of the second pixel in the RGB format, the Y-luminance value of the third pixel in the YUV format are calculated according to the G subpixel value of the third pixel in the RGB format, and the Y-luminance value of the fourth pixel in the YUV format are calculated according to the B subpixel value of the fourth pixel in the RGB format. The U-chrominance value of the first pixel in the YUV format is calculated according to subtracting the B subpixel value of the first pixel in the RGB format to an average of the R subpixel value of the first pixel and the G subpixel value of the second pixel in the RGB format. The V-chrominance value of the first pixel in the YUV format is calculated according to subtracting the R subpixel value of the fourth pixel in the RGB format and an average of the G subpixel value of the third pixel and the B subpixel value of the fourth pixel in the RGB format.

To achieve the above objective, one embodiment of the invention discloses a method applied in depacking a depth frame to convert from YUV format to RGB format. The YUV format includes Y subpixels (Y-luminance or Y-Luma), U subpixels (U-chrominance or U-chroma) and V subpixels (V-chrominance or V-chroma), and the RGB format includes R subpixels, G subpixels and B subpixels. The depth frame in YUV format include at least four adjacent pixels in one group. Of each pixel, the Y subpixel, U subpixel and V subpixel are arranged in vertical. These four pixels in each group includes a first pixel, a second pixel, a third pixel, and a fourth pixel. The first pixel is located adjacent to the second pixel and the third pixel, and the fourth pixel is also located adjacent to the second pixel and the third pixel. The method includes the following steps: obtaining four Y-luminance value, one U-chrominance value and one V-chrominance value from the four pixels of the YUV format; obtaining two R, two G and two B subpixel values of the RGB format according to the obtained four Y-luminance value, one U-chrominance value and one V-chrominance value. Of four pixels in the RGB format, the R subpixel value of the first pixel in the RGB format are calculated according to the Y-luminance value of the first pixel in the YUV format, the G subpixel value of the second pixel in the RGB format are calculated according to the Y-luminance value of the second pixel in the YUV format, the G subpixel value of the third pixel in the RGB format are calculated according to the Y-luminance value of the third pixel in the YUV format, and the B subpixel value of the fourth pixel in the RGB format are calculated according to the Y-luminance value of the fourth pixel in the YUV format. The B subpixel value of the first pixel in the RGB format is calculated according to the U-chrominance value of the first pixel in the YUV format and an average of the R subpixel value of the first pixel and the G subpixel value of the third pixel in the RGB format. The R subpixel value of the fourth pixel in the RGB format is calculated according to the V-chrominance value of the first pixel in the YUV format and an average of the G subpixel value of the second pixel and the B subpixel value of the fourth pixel in the RGB format.

To achieve the above objective, one embodiment of the invention discloses a circuit to convert a YUV format to a RGB format applied in depacking a depth frame. The YUV format includes Y subpixels (Y-luminance or Y-Luma), U subpixels (U-chrominance or U-chroma) and V subpixels (V-chrominance or V-chroma), and the RGB format includes R subpixels, G subpixels and B subpixels. The depth frame in YUV format include at least four adjacent pixels in one group. Of each pixel, the Y subpixel, U subpixel and V subpixel are arranged in vertical. These four pixels in each group includes a first pixel, a second pixel, a third pixel, and a fourth pixel. The first pixel is located adjacent to the second pixel and the third pixel, and the fourth pixel is also located adjacent to the second pixel and the third pixel. The circuit comprises a pixel retrieving unit and a pixel converting unit. The pixel retrieving unit retrieves and obtains four Y-luminance values, one U-chrominance value and one V-chrominance value from the four pixels of the YUV format. The pixel converting unit obtains two R, two G and two B subpixel values of the RGB format according to the obtained four Y-luminance value, one U-chrominance value and one V-chrominance value. Of four pixels in the RGB format, the R subpixel value of the first pixel in the RGB format are calculated according to the Y-luminance value of the first pixel in the YUV format, the G subpixel value of the second pixel in the RGB format are calculated according to the Y-luminance value of the second pixel in the YUV format, the G subpixel value of the third pixel in the RGB format are calculated according to the Y-luminance value of the third pixel in the YUV format, and the B subpixel value of the fourth pixel in the RGB format are calculated according to the Y-luminance value of the fourth pixel in the YUV format. The B subpixel value of the first pixel in the RGB format is calculated according to the U-chrominance value of the first pixel in the YUV format and an average of the R subpixel value of the first pixel and the G subpixel value of the third pixel in the RGB format. The R subpixel value of the fourth pixel in the RGB format is calculated according to the V-chrominance value of the first pixel in the YUV format and an average of the G subpixel value of the second pixel and the B subpixel value of the fourth pixel in the RGB format.

To achieve the above objective, one embodiment of the invention discloses a method applied in depacking a depth frame to convert from YUV format to RGB format. The YUV format includes Y subpixels (Y-luminance or Luma), U subpixels (U-chrominance or U-chroma) and V subpixels (V-chrominance or V-chroma), and the RGB format includes R subpixels, G subpixels and B subpixels. The depth frame in YUV format include at least four adjacent pixels in one group. Of each pixel, the Y subpixel, U subpixel and V subpixel are arranged in vertical. These four pixels in each group includes a first pixel, a second pixel, a third pixel, and a fourth pixel. The first pixel is located adjacent to the second pixel and the third pixel, and the fourth pixel is also located adjacent to the second pixel and the third pixel. The method includes the following steps: obtaining four Y-luminance value, one U-chrominance value and one V-chrominance value from the four pixels of the YUV format; obtaining two R, two G and two B subpixel values of the RGB format according to the obtained four Y-luminance value, one U-chrominance value and one V-chrominance value. Of four pixels in the RGB format, the R subpixel value of the first pixel in the RGB format are calculated according to the Y-luminance value of the first pixel in the YUV format, the G subpixel value of the second pixel in the RGB format are calculated according to the Y-luminance value of the second pixel in the YUV format, the G subpixel value of the third pixel in the RGB format are calculated according to the Y-luminance value of the third pixel in the YUV format, and the B subpixel value of the fourth pixel in the RGB format are calculated according to the Y-luminance value of the fourth pixel in the YUV format. The B subpixel value of the first pixel in the RGB format is calculated according to the U-chrominance value of the first pixel in the YUV format and an average of the R subpixel value of the first pixel and the G subpixel value of the second pixel in the RGB format. The R subpixel value of the fourth pixel in the RGB format is calculated according to the V-chrominance value of the first pixel in the YUV format and an average of the G subpixel value of the third pixel and the B subpixel value of the fourth pixel in the RGB format.

To achieve the above objective, one embodiment of the invention discloses a circuit to convert a YUV format to a RGB format applied in depacking a depth frame. The YUV format includes Y subpixels (Y-luminance or luma), U subpixels (U-chrominance or U-chroma) and V subpixels (V-chrominance or V-chroma), and the RGB format includes R subpixels, G subpixels and B subpixels. The depth frame in YUV format include at least four adjacent pixels in one group. Of each pixel, the Y subpixel, U subpixel and V subpixel are arranged in vertical. These four pixels in each group includes a first pixel, a second pixel, a third pixel, and a fourth pixel. The first pixel is located adjacent to the second pixel and the third pixel, and the fourth pixel is also located adjacent to the second pixel and the third pixel. The circuit comprises a pixel retrieving unit and a pixel converting unit. The pixel retrieving unit retrieves and obtains four Y-luminance value, one U-chrominance value and one V-chrominance value from the four pixels of the YUV format. The pixel converting unit obtains two R, two G and two B subpixel values of the RGB format according to the obtained four Y-luminance value, one U-chrominance value and one V-chrominance value. Of four pixels in the RGB format, the R subpixel value of the first pixel in the RGB format are calculated according to the Y-luminance value of the first pixel in the YUV format, the G subpixel value of the second pixel in the RGB format are calculated according to the Y-luminance value of the second pixel in the YUV format, the G subpixel value of the third pixel in the RGB format are calculated according to the Y-luminance value of the third pixel in the YUV format, and the B subpixel value of the fourth pixel in the RGB format are calculated according to the Y-luminance value of the fourth pixel in the YUV format. The B subpixel value of the first pixel in the RGB format is calculated according to the U-chrominance value of the first pixel in the YUV format and an average of the R subpixel value of the first pixel and the G subpixel value of the second pixel in the RGB format. The R subpixel value of the fourth pixel in the RGB format is calculated according to the V-chrominance value of the first pixel in the YUV format and an average of the G subpixel value of the third pixel and the B subpixel value of the fourth pixel in the RGB format.

Accordingly, the conversion methods and circuits, as illustrated by some embodiments of the present invention, are different from those conventional methods in that the methods and circuits, as illustrated by some embodiments of the present invention, do not utilize all three variables (i.e., all three sub-pixel values) of the RGB format or YUV format during conversion, but they still have the advantages of high compression rate, small data amount and high transferring efficiencies, as well as to be able to lower the loading to the transmission apparatus and occupy less bandwidth.

Also, compared with the conventional art, the inverse conversion methods and circuits, as illustrated by some embodiments of the present invention, can recover the conversed image data to obtain a better original depth frame and therefore to improves the distortion at the area having large (or dramatic) depth gap.

BRIEF DESCRIPTION OF THE DRAWINGS

The embodiments will become more fully understood from the detailed description and accompanying drawings, which are given for illustration only, and thus are not limitative of the present invention, and wherein.

DETAILED DESCRIPTION OF THE INVENTION

The embodiments of the invention will be apparent from the following detailed description, which proceeds with reference to the accompanying drawings, wherein the same references relate to the same elements.

The conversion and inverse conversion methods and circuits of the present disclosure are applied to the packing and unpacking techniques of the 3D depth of field system. In addition, the conversion and inverse conversion methods and circuits of the present disclosure can be applied to the compression and transmission of gray scale image signals. The present disclosure is preferably applied to the packing and unpacking techniques of the 3D image system disclosed by the inventors in U.S. patent application Ser. Nos. 14/504,901, 14/504,936, 14/505,117 and 14/505,153, wherein each of the above references is incorporated herein in its entirety by reference.

Figure 13:
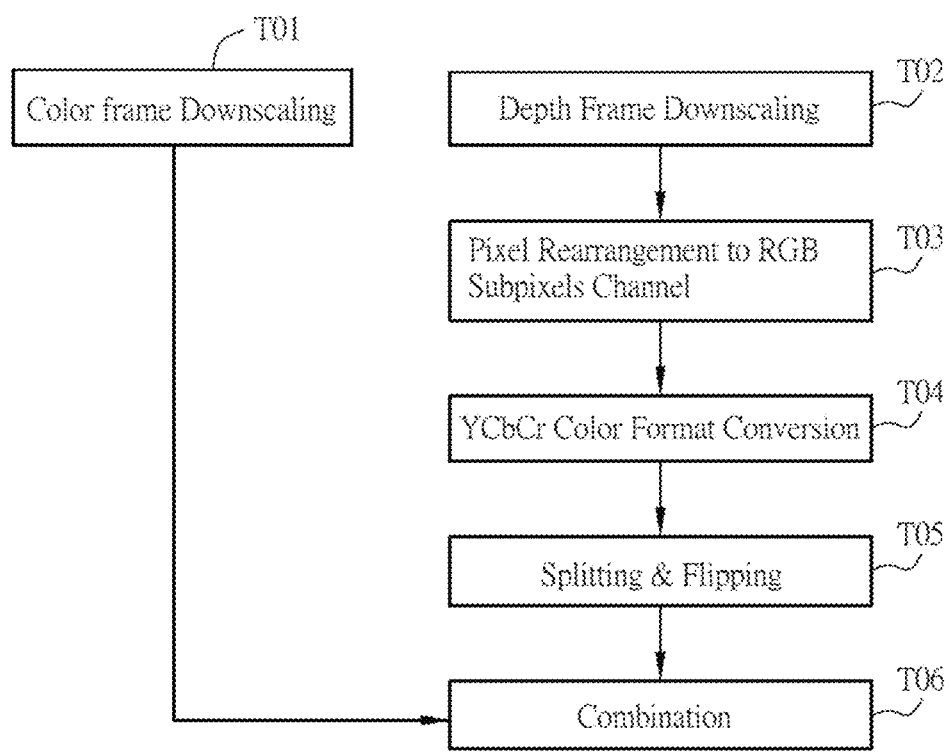
FIG. 13 is a flow chart illustrated a packing process for 3D image and depth of field carried out by a system according to one embodiment of the disclosure.

In addition, the disclosed packing technology for 3D image and depth of field system includes the following steps as shown in FIG. 13. The steps include: resizing (downscaling) the color frame and the depth frame (Downscaling, steps Q01 and Q02, respectively); performing a pixel rearrangement of the resized depth frame to a RGB subpixel format (Pixel Rearrangement, step Q03), converting the RGB format to a YUV format (Format Conversion, step Q04), a splitting and flipping procedure for the resized (downscaled) depth frame (Splitting & Flipping, step Q05); combining the processed depth frame with the resized (downscaled) color frame (Combination, step Q06), followed by transmitting the combined the combined depth frame and color frame; receiving the combined depth frame and color frame by a receiving end; and inverse converting the received depth frame and color frame to obtain the original color frame and depth frame. The conversion method and circuit (from RGB format to YUV format) according to some embodiments of the disclosure are applied to the above-mentioned step of Format Conversion, and the inverse conversion method (from YUV format to RGB format) according to some embodiments of the disclosure is applied to the inverse converting step in the receiving end.

In the steps shown in FIG. 13, if the step of Pixel Rearrangement is omitted, the arrangement of the RGB pixels and subpixels also can directly represent the three consecutive pixels which locates in the corresponding positions of the depth frame image data. The YUV (color) format can also be named as YCbCr format, i.e., Cb is represented by U and Cr is represented by V.

In other words, this disclosure is based on the packing and depacking technology for color frame and depth frame provided by the inventor, and further discloses the conversion method for a depth frame format (converting from RGB format to YUV format) and an inverse conversion for the depth frame format (converting from YUV format to RGB format). This disclosure includes the conversion and inverse conversion methods and circuits for solving the distortion of the positions of the depth frame having large depth gap, especially the adjacent positions have large depth gap (i.e, the area having dramatic changes or differences of the pixel/subpixel values of the depth frame), during the conversion of the depth frame. The conversion process in the disclosure refers to the process for converting image data in the RGB format to the YUV format, and the inverse conversion process refers to the process for converting image data in YUV format to the RGB format (i.e., recovering image data in RGB format from the YUV format).

Figure 1A:
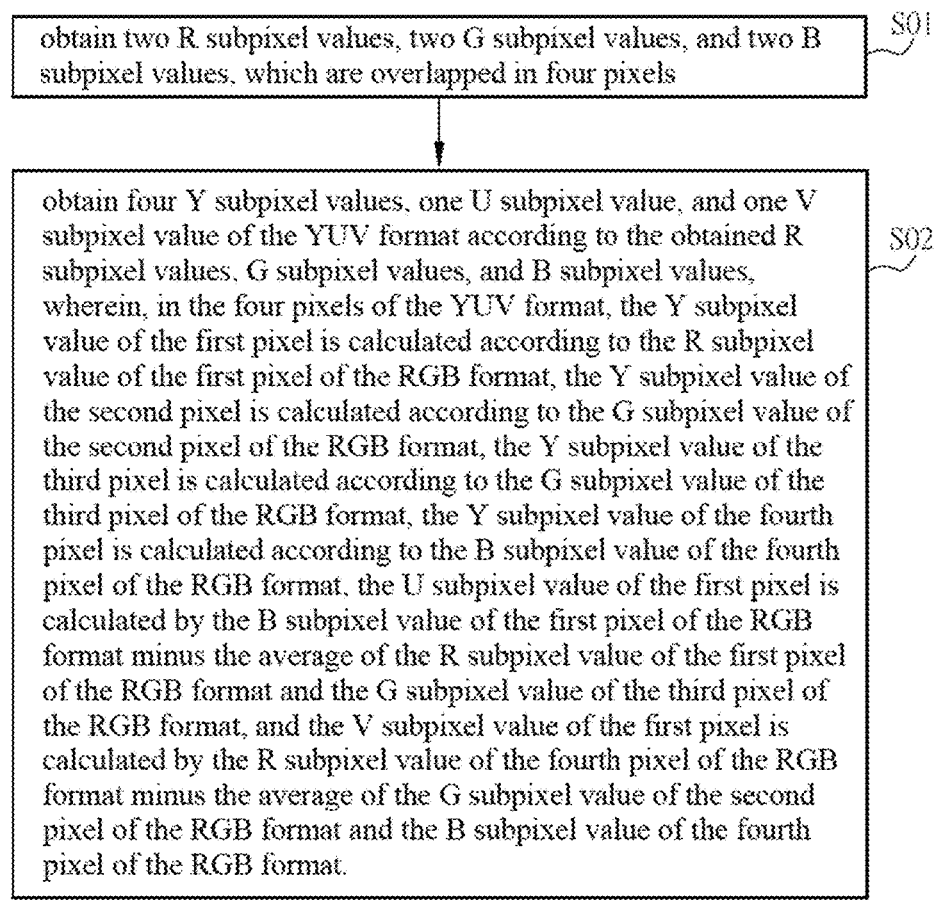
FIG. 1A is a flow chart showing a method for converting an image data from an RGB format to YUV format according to an embodiment of the disclosure.
Figure 1B:
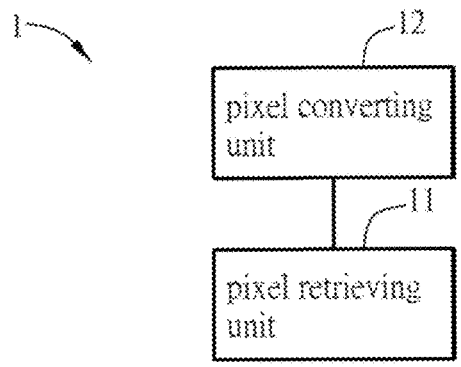
FIG. 1B is a block diagram of a conversion circuit for converting an image data from an RGB format to YUV format according to an embodiment of the disclosure.

FIG. 1A is a flow chart showing a method for converting an image data from an RGB format to YUV format according to an embodiment of the disclosure, and FIG. 1B is a block diagram of a conversion circuit 1 for converting an image data from an RGB format to YUV format according to an embodiment of the disclosure.

A gray-level image data, such as, for example but not limited to a depth frame, can be packed in the RGB format, and can be converted to obtain the YUV format image data after processed by the conversion method and conversion circuit 1 of this disclosure. The YUV format, especially the image data of YUV420 or 422 format, can occupy less bandwidth in transmission and less memory space in storage, thereby achieving high efficient video compression and transmission. The RGB format includes R subpixels, G subpixels and B subpixels, and the YUV format includes Y subpixels, U subpixels and V subpixels. In this embodiment, the RGB format image data include groups of adjacent four pixels. In other words, each group includes four adjacent pixels. In the following example, four pixels of every group of the image data are converted from the RGB format to the YUV format. The four pixels of each group includes a first pixel, a second pixel, a third pixel, and a fourth pixel. The first pixel is located adjacent to the second pixel and the third pixel, and the fourth pixel is also located adjacent to the second pixel and the third pixel. In addition, the R subpixel, G subpixel and B subpixel of each pixel are arranged in vertical. In other words, the R subpixel, G subpixel and B subpixel of each pixel are arranged in the same column.

As shown in FIG. 1A, the method for converting the image data from the RGB format to the YUV format includes steps S01 and S02. The step S01 is to obtain two R subpixel values, two G subpixel values, and two B subpixel values, which are in interleaved (or crisscrossed) positions in four pixels. The step S02 is to obtain four Y-luminance values, one U-chrominance value, and one V-chrominance value of the YUV format according to the obtained R subpixel values, G subpixel values, and B subpixel values. In the four pixels of the YUV format, the Y-luminance value of the first pixel is calculated according to the R subpixel value of the first pixel of the RGB format, the Y-luminance value of the second pixel is calculated according to the G subpixel value of the second pixel of the RGB format, the Y-luminance value of the third pixel is calculated according to the G subpixel value of the third pixel of the RGB format, the Y-luminance value of the fourth pixel is calculated according to the B subpixel value of the fourth pixel of the RGB format, the U-chrominance value of the first pixel is calculated by the B subpixel value of the first pixel of the RGB format minus the average of the R subpixel value of the first pixel of the RGB format and the G subpixel value of the third pixel of the RGB format, and the V-chrominance value of the first pixel is calculated by the R subpixel value of the fourth pixel of the RGB format minus the average of the G subpixel value of the second pixel of the RGB format and the B subpixel value of the fourth pixel of the RGB format.

Referring to FIG. 1B, the conversion circuit 1 includes a pixel retrieving unit 11 and a pixel converting unit 12, which are electrically connected to each other. The pixel retrieving unit 11 can retrieve two R subpixel values, two G subpixel values, and two B subpixel values, which are in interleaved (or crisscrossed) positions in each four pixels (as a group) of the image data. The pixel converting unit 12 can obtain four Y-luminance values, one U-chrominance value, and one V-chrominance value of the YUV format according to the retrieved R subpixel values, G subpixel values, and B subpixel values. In this case, the pixel retrieving unit 11 and the pixel converting unit 12 can be carried out by hardware circuits or firmwares. In one embodiment, the conversion circuit 1 may include, for example, an adder, a subtractor, a multiplier, and/or a divider.

The pixel retrieving unit 11 can retrieve the required R subpixel values, G subpixel values, and B subpixel values for the conversion process of each group. The pixel converting unit 12 can convert the retrieved R subpixel values, G subpixel values, and B subpixel values to obtain the desired YUV format image data. In some embodiments, the pixel converting unit 12 converts four pixels of one group to obtain the YUV format image data and then stores the data to the corresponding first pixel, second pixel, third pixel and fourth pixel of the same group. In some embodiments, the pixel converting unit 12 may convert four pixels of all groups to obtain the YUV format image data and then stores the data to the corresponding first pixels, second pixels, third pixels and fourth pixels of all group. This disclosure is not limited. In addition, a memory unit (not shown) is provided to electrically connect with the pixel retrieving unit 11 and the pixel converting unit 12 for storing the image data before and after the conversion process. The conversion method will be described in the following embodiments.

Figure 2A:
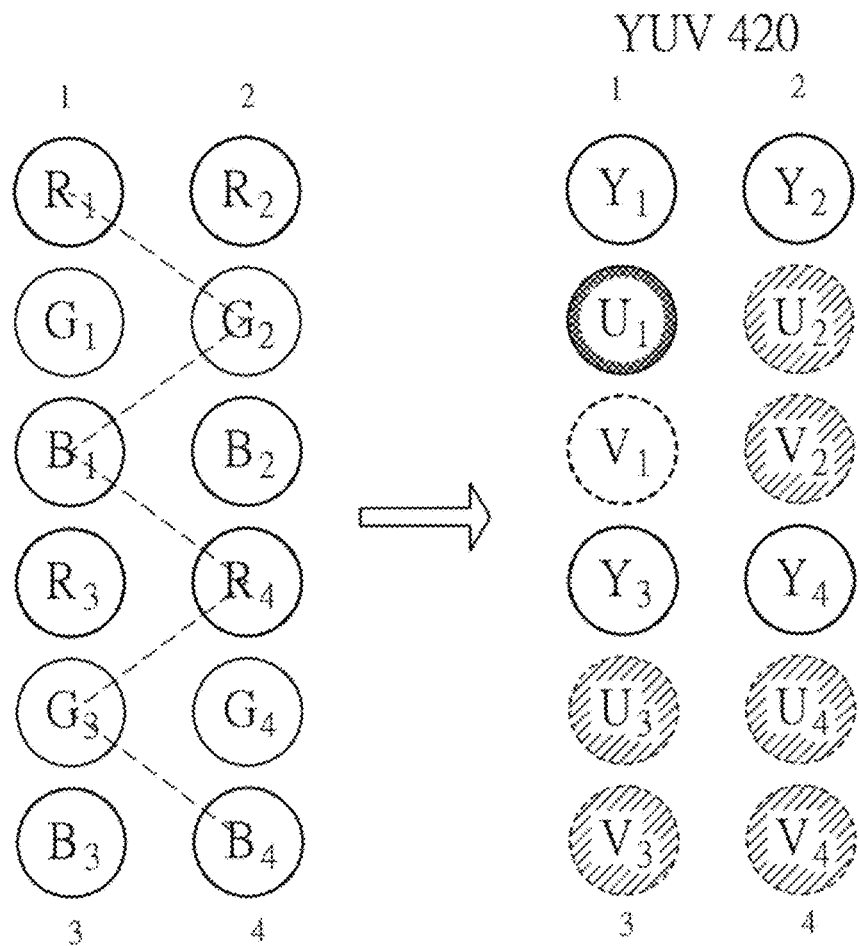
FIG. 2A is a schematic diagram showing an embodiment for converting the image data from the RGB format to the YUV420 format.

FIG. 2A is a schematic diagram showing an embodiment for converting the image data from the RGB format to the YUV420 format. Referring to FIG. 2A, each pixel includes three subpixels, which are red, green and blue subpixels (R, G and B). The R, G and B subpixels of each pixel are arranged vertically (in the same column). After the conversion process, each pixel of the YUV format image data also include three subpixels, including a luminance Y and two chrominances U and V. The Y, U and V subpixels are also arranged vertically.

The position and subpixel value of each subpixel are assigned with corresponding subscript labels. For example, as shown in FIG. 2A, $R_1$ represents the position and subpixel value of the R subpixel of the first pixel, $G_1$ represents the position and subpixel value of the G subpixel of the first pixel, and $B_1$ represents the position and subpixel value of the B subpixel of the first pixel. Similarly, $Y_1$ represents the position and subpixel value of the Y subpixel of the first pixel, $U_1$ represents the position and subpixel value of the U subpixel of the first pixel, and $V_1$ represents the position and subpixel value of the V subpixel of the first pixel. To be noted, if the subpixel is shown with the hatchings, it means that this subpixel does not have the subpixel value. For example, in the YUV420 format as shown in FIG. 2A, only the positions of the $Y_1 \sim Y_4$, $U_1$ and $V_1$ subpixels have corresponding subpixel values, and the positions of the $U_2 \sim U_4$ and $V_2 \sim V_4$ subpixels do not have corresponding subpixel values. In addition, as shown in FIG. 2A, the first pixel of the RGB format or YUV format includes three subpixels located at the left-top corner in vertical (represented by 1), the second pixel includes three subpixels located at the right-top corner in vertical (represented by 2), the third pixel includes three subpixels located at the left-bottom corner in vertical (represented by 3), and the fourth pixel includes three subpixels located at the right-bottom corner in vertical (represented by 4). To be noted, this disclosure is not limited thereto. In some embodiments, the positions of the first to fourth pixels can be changed, and any arrangement fitting the requirement that the first pixel is located adjacent to the second and third pixels and the fourth pixel is located adjacent to the second and third pixels can be used in this disclosure.

In this embodiment, the method for converting the image data from the RGB format to the YUV420 format is to obtain two R subpixel values, two G subpixel values, and two B subpixel values, which are overlapped in the four pixels, by the pixel retrieving unit 11, and to obtain four Y subpixel values, one U subpixel value, and one V subpixel value of the YUV420 format according to the obtained R subpixel values, G subpixel values, and B subpixel values. In four pixels of one embodiment, the pixel retrieving unit 11 obtains the R subpixel values of the first and fourth pixels, the G subpixel values of the second and third pixels, and the B subpixel values of the first and fourth pixels, and then four Y subpixel values ($Y_1 \sim Y_4$), one U subpixel value ($U_1$), and one V subpixel value ($V_1$) of the YUV format are obtained according to the obtained R subpixel values of the first and fourth pixels, G subpixel values of the second and third pixels, and B subpixel values of the first and fourth pixels.

Herein, the Y subpixel value of the first pixel is equal to the R subpixel value of the first pixel multiplied by 0.8588 and added with 16, the Y subpixel value of the second pixel is equal to the G subpixel value of the second pixel multiplied by 0.8588 and added with 16, the Y subpixel value of the third pixel is equal to the G subpixel value of the third pixel multiplied by 0.8588 and added with 16, the Y subpixel value of the fourth pixel is equal to the B subpixel value of the fourth pixel multiplied by 0.8588 and added with 16, the U subpixel value of the first pixel is equal to the B subpixel value of the first pixel minus the average of the R subpixel value of the first pixel and the G subpixel value of the third pixel and then multiplied by 0.4392 and added with 128, and the V subpixel value of the first pixel is equal to the R subpixel value of the fourth pixel minus the average of the G subpixel value of the second pixel and the B subpixel value of the fourth pixel and then multiplied by 0.4392 and added with 128. These can be presented as the following equations:

$$Y_1 = 0.8588 \times R_1 + 16 \quad (1);$$

$$Y_2 = 0.8588 \times G_2 + 16 \quad (2);$$

$$Y_3 = 0.8588 \times G_3 + 16 \quad (3);$$

$$Y_4 = 0.8588 \times B_4 + 16 \quad (4);$$

$$U_1 = 0.4392 \times (B_1 - 0.5 \times (R_1 + G_3)) + 128 \quad (5);$$

$$V_1 = 0.4392 \times (R_4 - 0.5 \times (G_2 + B_4)) + 128 \quad (6);$$

The above equations (1)~(6) can be known as the first stage conversion. Herein, the equations (1)~(6) include four linear Y value ($Y_1 \sim Y_4$) conversion codings (also named as linear mapping, converting the RGB field value {0, 255} to the Y field value {16, 235}) and two linear UV value ($U_1$, $V_1$) prediction differential conversion codings (also named as linear mapping DPCM: converting the differential field value {−255, 255} to the U and V field values {16, 240}). The linear mapping can convert the Y values to match the distribution of the conventional Y values, and the linear mapping DPCM can make the UV values to have the same characteristics as the conventional UV values. This configuration can remain the original compression quality and the better quality of the depth depacking. For equations (5) and (6), the prediction differential values D are D=$B_1$−0.5×($R_1$+$G_3$) and D=$R_4$−0.5×($G_2$+$B_4$), respectively. Since the converted YUV420 format image data do not contain the $U_2 \sim U_4$ and $V_2 \sim V_4$ values, the image transmission of the YUV420 format image data can occupy less bandwidth and the storage thereof can use less memory space, thereby achieving the high efficient video compression and transmission.

The above equations (5)~(6) can use prediction linear differential conversion codings or nonlinear prediction differential conversion codings (also named as nonlinear mapping) according to the distribution of the prediction differential values D. The general prediction differential value conversion equation is:

$$U_1 = f(B_1 - 0.5 \times (R_1 + G_3)) + 128 \quad (7);$$

$$V_1 = f(R_4 - 0.5 \times (G_2 + B_4)) + 128. \quad (8);$$

if using a linear function for converting, then:

$$f(D) = 0.4392 \times D \quad (9);$$

The equation (7) and (8) equal to the equations (5) and (6). If using a nonlinear function for converting, the conversion function may be a piece-wise linear function:

$$f(D) = \begin{cases} 0.4280 \times (D+5) - 5, & -255 \leq D < -5, \\ D, & -5 \leq D \leq +5, \\ 0.4280 \times (D-5) + 5, & +5 < D \leq 255. \end{cases} \quad (10)$$

Figure 2B:
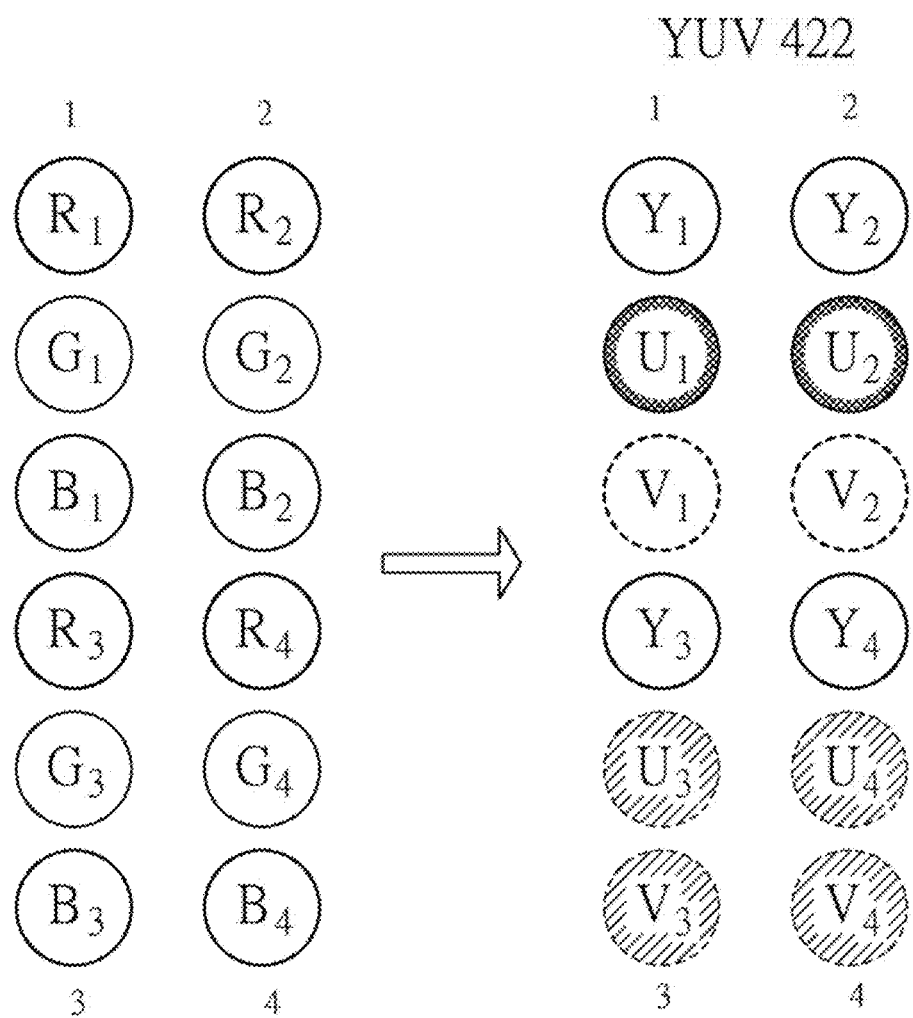
FIG. 2B is a schematic diagram showing the embodiment for converting the image data from the RGB format to the YUV422 format.

FIG. 2B is a schematic diagram showing the embodiment for converting the image data from the RGB format to the YUV422 format.

In the method for converting the image data from the RGB format to the YUV422 format, the pixel retrieving unit 11 obtains the $Y_1 \sim Y_4$, $U_1$ and $V_1$ values of YUV 420 as shown in FIG. 2A and another R subpixel value ($R_2$) and another B subpixel value ($B_3$) of the four pixels, and the pixel converting unit 12 further obtains the U subpixel value ($U_2$) of the second pixel and the V subpixel value ($V_2$) of the second pixel of the YUV format according to the obtained R subpixel values, G subpixel values and B subpixel values. The equations for obtaining the $Y_1 \sim Y_4$ values can be referred to the above equations (1)~(4), and the equations for obtaining the $U_1$ and $V_1$ values can be referred to the above equations (7)~(8). If the conversion is linear, the equation (9) can be referred, and if the conversion is nonlinear, the equation (10) can be referred. The U subpixel (U-chrominance) value of the second pixel is calculated by the R subpixel value of the second pixel minus the average of the R subpixel value of the first pixel and the G subpixel value of the second pixel, and the V subpixel (V-chrominance) value of the second pixel is calculated by the B subpixel value of the third pixel minus the average of the G subpixel value of the third pixel and the B subpixel value of the fourth pixel.

In one embodiment, the U subpixel value of the second pixel is equal to the prediction differential value D (the R subpixel value of the second pixel minus the average of the R subpixel value of the second pixel and the G subpixel value of the second pixel) that is converted by the function f(D) and added with 128, and the V subpixel value of the second pixel is equal to the prediction differential value D (the B subpixel value of the third pixel minus the average of the G subpixel value of the third pixel and the B subpixel value of the fourth pixel) that is converted by the function f(D) and added with 128. These can be presented as the following equations:

$$U_2 = f(R_2 - 0.5 \times (R_1 + G_2)) + 128; \quad (11);$$

$$V_2 = f(B_3 - 0.5 \times (G_3 + B_4)) + 128; \quad (12);$$

For the equation (11) and (12), the prediction differential values D are represented by D=$R_2$−0.5×($R_1$+$G_2$) and D=$B_3$−0.5×($G_3$+$B_4$), respectively. If the conversion is linear, the function f(D) is referred to the equation (9), and if the conversion is nonlinear, the function f(D) is referred to the equation (10).

The above equations (11)~(12) can be known as the second stage conversion. In other words, the conversion process of the YUV422 format includes the first stage conversion (YUV420 format) and the second stage conversion. Herein, the equations (1)~(4) include four linear Y value ($Y_1 \sim Y_4$) conversion codings (also named as linear mapping) and the equations (7), (8), (11) and (12) include four UV values ($U_1$, $U_2$, $V_1$ and $V_2$) prediction linear differential conversion codings (also named as DPCM). Herein, the converted YUV422 format image data do not contain the $U_3$~$U_4$ and $V_3$~$V_4$ values.

Figure 2C:
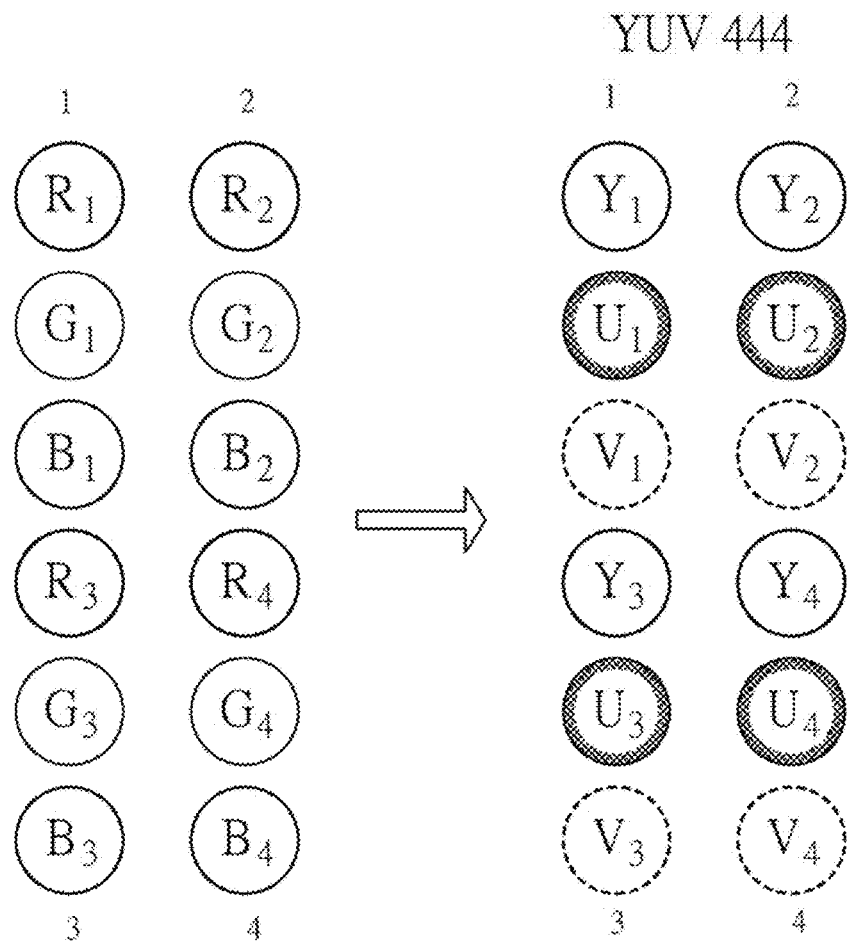
FIG. 2C is a schematic diagram showing the embodiment for converting the image data from the RGB format to the YUV444 format.

FIG. 2C is a schematic diagram showing the embodiment for converting the image data from the RGB format to the YUV444 format.

In the method for converting the image data from the RGB format to the YUV444 format, the pixel retrieving unit 11 obtains the $Y_1$~$Y_4$, $U_1$~$U_2$ and $V_1$~$V_2$ values of YUV 422 and all the residual R subpixel values, G subpixel values and B subpixel values of the four pixels (including $R_3$, $G_1$, $G_4$ and $B_2$). The pixel converting unit 12 further obtain two additional U subpixel values ($U_3$ and $U_4$) and two additional V subpixel values ($V_3$ and $V_4$) of the YUV format according to the obtained R subpixel values, G subpixel values and B subpixel values. In other words, all of the subpixel values of the YUV format are obtained. The equations for obtaining the $Y_1$~$Y_4$, $U_1$~$U_2$ and $V_1$~$V_2$ values can be referred to the above equations (1)~(12). The U subpixel value of the third pixel is calculated according to the conversion function value of the prediction differential value D (i.e., the G subpixel value of the first pixel minus the average of the R subpixel value of the first pixel and the B subpixel value of the first pixel), the V subpixel value of the third pixel is calculated according to conversion function value of the differential value D (i.e., the G subpixel value of the fourth pixel minus the average of the R subpixel value of the fourth pixel and the B subpixel value of the fourth pixel), the U subpixel value of the fourth pixel is calculated according to the conversion function value of the prediction differential value D (i.e., the R subpixel value of the third pixel minus the average of the B subpixel value of the first pixel and the G subpixel value of the third pixel), and the V subpixel value of the fourth pixel is calculated according to the conversion function value of the prediction differential value D (i.e., the B subpixel value of the second pixel minus the average of the G subpixel value of the second pixel and the R subpixel value of the fourth pixel).

In one embodiment, the U subpixel value of the third pixel is equal to the value of the function f(D) of the prediction differential value D (i.e., the G subpixel value of the first pixel minus the average of the R subpixel value of the first pixel and the B subpixel value of the first pixel) and added with 128, the V subpixel value of the third pixel is equal to the value of the function f(D) of the prediction differential value D (i.e., the G subpixel value of the fourth pixel minus the average of the R subpixel value of the fourth pixel and the B subpixel value of the fourth pixel) and added with 128, the U subpixel value of the fourth pixel is equal to the value of the function f(D) of the prediction differential value D (i.e., the R subpixel value of the third pixel minus the average of the B subpixel value of the first pixel and the G subpixel value of the third pixel) added with 128, and the V subpixel value of the fourth pixel is equal to the value of the function f(D) of the prediction differential value D (i.e., the B subpixel value of the second pixel minus the average of the G subpixel value of the second pixel and the R subpixel value of the fourth pixel) and added with 128. These can be presented as the following equations:

$$U_3 = f(G_1 - 0.5 \times (R_1 + B_1)) + 128; \quad (13)$$

$$V_3 = f(G_4 - 0.5 \times (R_4 + B_4)) + 128; \quad (14)$$

$$U_4 = f(R_3 - 0.5 \times (B_1 + G_3)) + 128; \quad (15)$$

$$V_4 = f(B_2 - 0.5 \times (G_2 + R_4)) + 128; \quad (16)$$

For the equations (13), (14), (15) and (16), the prediction differential values D can be represented by $D = G_1 - 0.5 \times (R_1 + B_1)$, $D = G_4 - 0.5 \times (R_4 + B_4)$, $D = R_3 - 0.5 \times (B_1 + G_3)$ and $D = B_2 - 0.5 \times (G_2 + R_4)$, respectively. If the conversion is nonlinear, the function f(D) is the equation (10).

Accordingly, the conversion process of the YUV444 format includes the first stage conversion, the second stage conversion and a third stage conversion including the above equations ($U_3$, $U_4$, $V_1$ and $V_2$). Herein, the equations include four linear Y value ($Y_1$~$Y_4$) conversion codings (also named as linear mapping) and eight UV values ($U_1$~$U_4$ and $V_1$~$V_4$) prediction linear differential conversion codings (also named as DPCM).

Figure 2D:
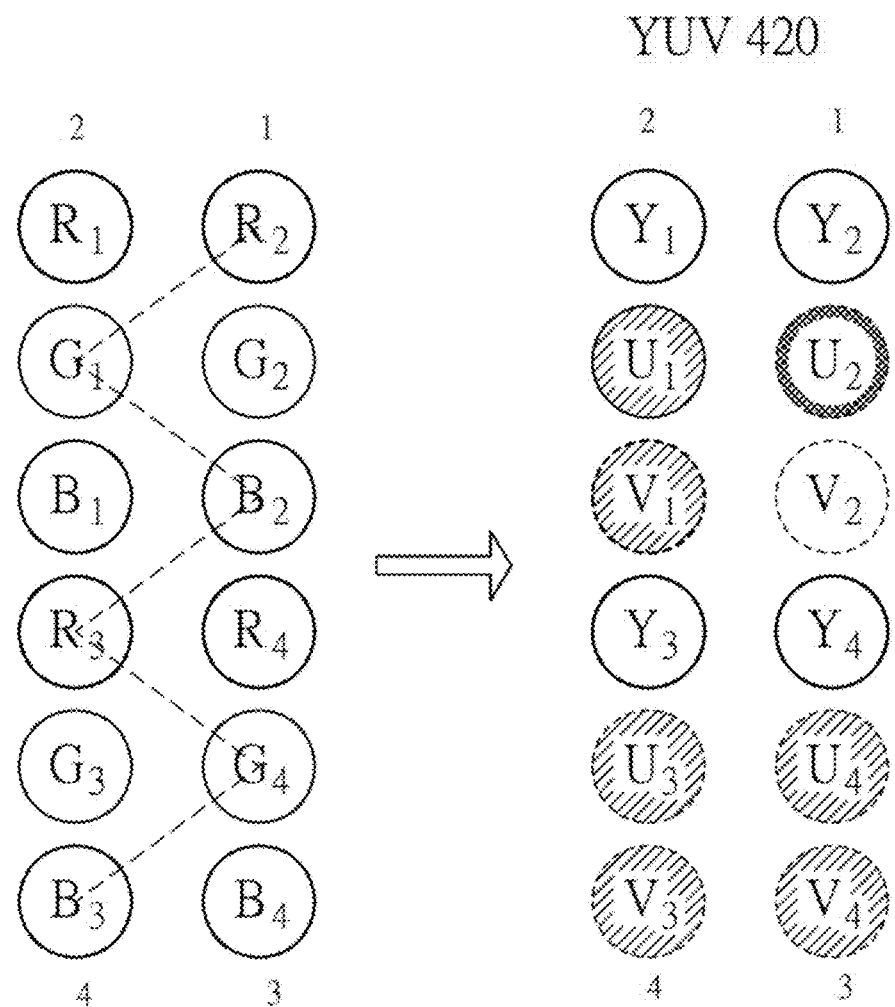
FIG. 2D is a schematic diagram showing another embodiment for converting the image data from the RGB format to the YUV420 format.

Please refer to FIGS. 2A and 2D. FIG. 2D is a schematic diagram showing another embodiment for converting the image data from the RGB format to the YUV420 format.

As shown in FIG. 2A, the first pixel of the RGB format or YUV format includes three subpixels located at the left-top corner in vertical (represented by 1), the second pixel includes three subpixels located at the right-top corner in vertical (represented by 2), the third pixel includes three subpixels located at the left-bottom corner in vertical (represented by 3), and the fourth pixel includes three subpixels located at the right-bottom corner in vertical (represented by 4). In FIG. 2D, the first pixel of the RGB format or YUV format includes three subpixels located at the right-top corner in vertical, the second pixel includes three subpixels located at the left-top corner in vertical, the third pixel includes three subpixels located at the right-bottom corner in vertical, and the fourth pixel includes three subpixels located at the left-bottom corner in vertical.

Similarly, as shown in FIG. 2D, the Y subpixel value of the first pixel is equal to the R subpixel value of the first pixel multiplied by 0.8588 and added with 16, the Y subpixel value of the second pixel is equal to the G subpixel value of the second pixel multiplied by 0.8588 and added with 16, the Y subpixel value of the third pixel is equal to the G subpixel value of the third pixel multiplied by 0.8588 and added with 16, the Y subpixel value of the fourth pixel is equal to the B subpixel value of the fourth pixel multiplied by 0.8588 and added with 16, the U subpixel value of the first pixel is equal to the B subpixel value of the first pixel minus the average of the R subpixel value of the first pixel and the G subpixel value of the third pixel and then multiplied by 0.4392 and added with 128, and the V subpixel value of the first pixel is equal to the R subpixel value of the fourth pixel minus the average of the G subpixel value of the second pixel and the B subpixel value of the fourth pixel and then multiplied by 0.4392 and added with 128. In the embodiment shown in FIG. 2D, the first stage conversion includes the following equations:

$$Y_2 = 0.8588 \times R_2 + 16; \quad (17)$$

$$Y_1 = 0.8588 \times G_1 + 16; \quad (18)$$

$$Y_4 = 0.8588 \times G_4 + 16; \quad (19)$$

$$Y_3 = 0.8588 \times B_3 + 16; \quad (20)$$

$$U_2 = f(B_2 - 0.5 \times (R_2 + G_4)) + 128; \quad (21)$$

$$V_2 = f(R_3 - 0.5 \times (G_1 + B_3)) + 128; \quad (22)$$

Herein, for the equations (21) and (22), the prediction differential values D can be represented by $D = B_2 - 0.5 \times (R_2 + G_4)$ and $D = R_3 - 0.5 \times (G_1 + B_3)$, respectively. If the conversion is linear, the function f(D) is the equation (9). If the conversion is nonlinear, the function f(D) is the equation (10).

In the procedure for converting from the RGB format to the YUV format, this disclosure utilizes the alternate (in an interleaved/crisscrossed manner) sampling method (see the dotted lines of FIGS. 2A and 2D) for obtaining the corresponding YUV format subpixel values. This disclosure does not limit the arrangement of the first, second third and fourth pixels in the group, and any arrangement fitting the requirement that the first pixel is located adjacent to the second and third pixels and the fourth pixel is located adjacent to the second and third pixels can be used in this disclosure.

Figure 3:
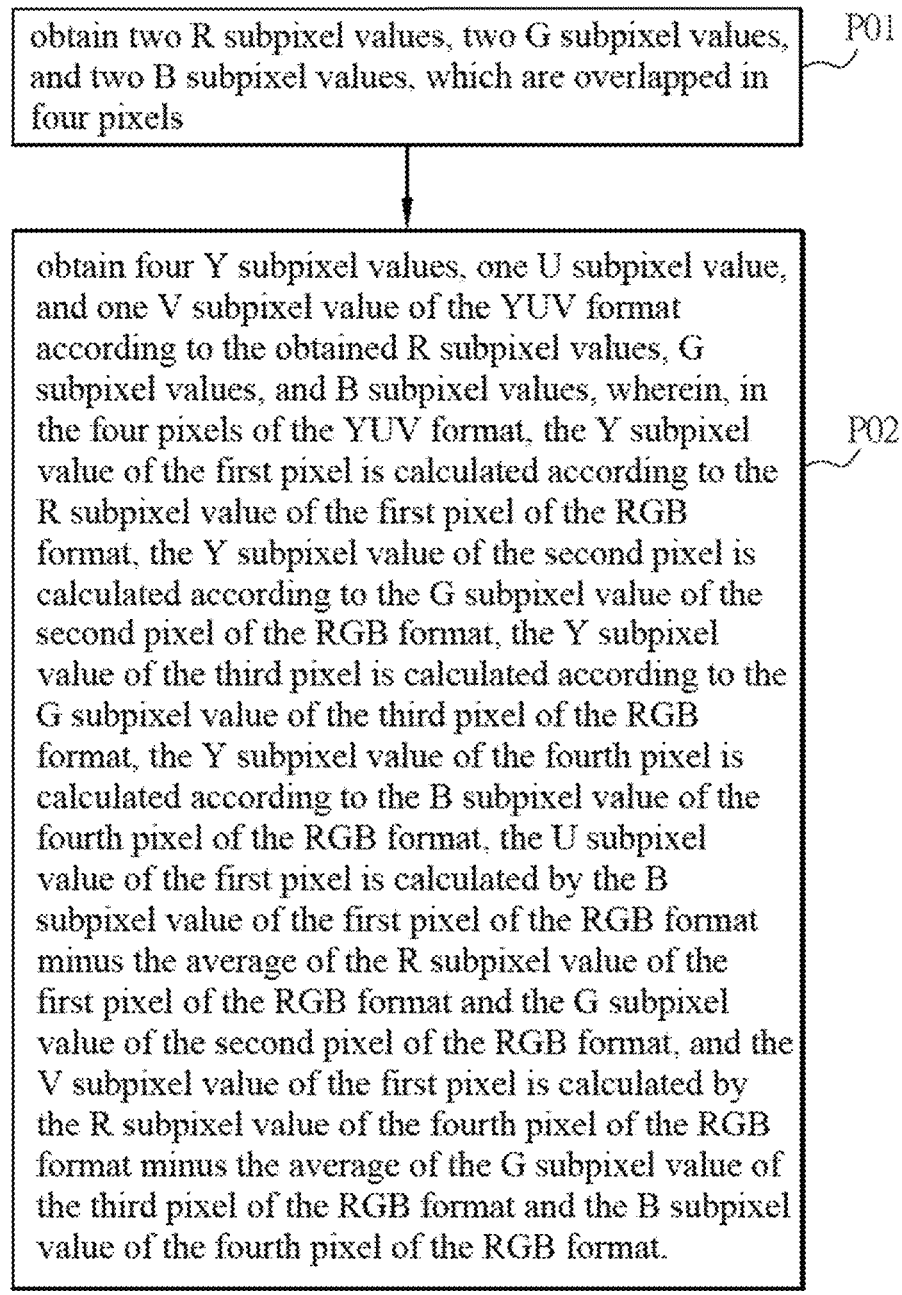
FIG. 3 is a flow chart showing another method for converting the image data from the RGB format to the YUV format.

Please refer to FIGS. 1B and 3. FIG. 3 is a flow chart showing the method for converting the image data from the RGB format to the YUV format.

In this embodiment, the RGB format image data include groups of adjacent four pixels. In other words, each group includes four adjacent pixels. The four pixels of each group includes a first pixel, a second pixel, a third pixel, and a fourth pixel. The first pixel is located adjacent to the second pixel and the third pixel, and the fourth pixel is also located adjacent to the second pixel and the third pixel. In addition, the R subpixel, G subpixel and B subpixel of each pixel are arranged in horizontal. In other words, the R subpixel, G subpixel and B subpixel of each pixel are arranged in the same row.

As shown in FIG. 3, the method for converting the image data from the RGB format to the YUV format includes steps P01 and P02. The step P01 is to obtain two R subpixel values, two G subpixel values, and two B subpixel values, which are interleaved (or crisscrossed) in positions of the four pixels. The step P02 is to obtain four Y subpixel values, one U subpixel value, and one V subpixel value of the YUV format according to the obtained R subpixel values, G subpixel values, and B subpixel values. In the four pixels of the YUV format, the Y-luminance value of the first pixel is calculated according to the R subpixel value of the first pixel of the RGB format, the Y-luminance value of the second pixel is calculated according to the G subpixel value of the second pixel of the RGB format, the Y-luminance value of the third pixel is calculated according to the G subpixel value of the third pixel of the RGB format, the Y-luminance value of the fourth pixel is calculated according to the B subpixel value of the fourth pixel of the RGB format, the U-chrominance value of the first pixel is calculated according to the B subpixel value of the first pixel of the RGB format minus the average of the R subpixel value of the first pixel of the RGB format and the G subpixel value of the second pixel of the RGB format, and the V-chrominance value of the first pixel is calculated according to the R subpixel value of the fourth pixel of the RGB format minus the average of the G subpixel value of the third pixel of the RGB format and the B subpixel value of the fourth pixel of the RGB format.

The pixel retrieving unit 11 can retrieve two R subpixel values, two G subpixel values, and two B subpixel values, which are interleaved (or crisscrossed) in positions of each four pixels (as a group) of the image data. The pixel converting unit 12 can obtain four Y-luminance values, one U-chrominance value, and one V-chrominance value of the YUV format according to the retrieved R subpixel values, G subpixel values, and B subpixel values. The conversion method will be described in the following embodiment with reference to FIG. 3.

Figure 4A:
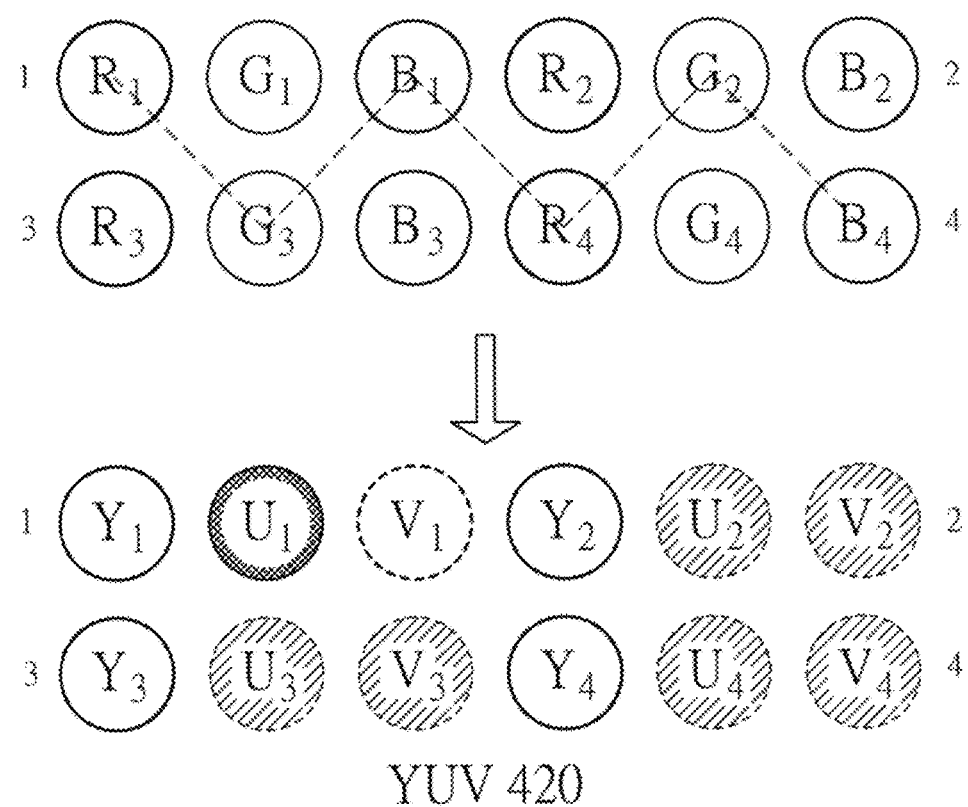
FIG. 4A is a schematic diagram showing an embodiment for converting the image data from the RGB format to the YUV420 format.

FIG. 4A is a schematic diagram showing the embodiment for converting the image data from the RGB format to the YUV420 format.

In this embodiment, the subpixels of each pixel of the RGB format are arranged in horizontal, and the subpixels of the converted YUV format image data are also arranged in horizontal. Herein, the first pixel is located adjacent to the second and third pixels, and the fourth pixel is also located adjacent to the second and third pixels. As shown in FIG. 4A, the first pixel of the RGB format or YUV format includes three subpixels located at the left-top corner in horizontal (represented by 1), the second pixel includes three subpixels located at the right-top corner in horizontal (represented by 2), the third pixel includes three subpixels located at the left-bottom corner in horizontal (represented by 3), and the fourth pixel includes three subpixels located at the right-bottom corner in horizontal (represented by 4). To be noted, this disclosure is not limited thereto. In some embodiments, the positions of the first to fourth pixels can be changed, and any arrangement fitting the requirement that the first pixel is located adjacent to the second and third pixels and the fourth pixel is located adjacent to the second and third pixels can be used in this disclosure.

The method for converting the image data from the RGB format to the YUV420 format is to obtain two R subpixel values, two G subpixel values, and two B subpixel values, which are interleaved or crisscrossed in position of the four pixels, by the pixel retrieving unit 11, and to obtain four Y-luminance values, one U-chrominance value, and one V-chrominance value of the YUV format according to the obtained R subpixel values, G subpixel values, and B subpixel values. In four pixels of the YUV420 format of one embodiment, the pixel retrieving unit 11 obtains the R subpixel values of the first and fourth pixels ($R_1$ and $R_4$), the G subpixel values of the second and third pixels ($G_2$ and $G_3$), and the B subpixel values of the first and fourth pixels ($B_1$ and $B_4$), and then the pixel converting unit 12 obtains four Y-luminance values ($Y_1 \sim Y_4$), one U-chrominance value ($U_1$), and one V-chrominance value ($V_1$) of the YUV format according to the obtained R subpixel values of the first and fourth pixels, G subpixel values of the second and third pixels, and B subpixel values of the first and fourth pixels.

In the four pixels of the YUV format, the Y luminance value of the first pixel is equal to the R subpixel value of the first pixel multiplied by 0.8588 and added with 16, the Y luminance value of the second pixel is equal to the G subpixel value of the second pixel multiplied by 0.8588 and added with 16, the Y luminance value of the third pixel is equal to the G subpixel value of the third pixel multiplied by 0.8588 and added with 16, the Y luminance value of the fourth pixel is equal to the B subpixel value of the fourth pixel multiplied by 0.8588 and added with 16, the U chrominance value of the first pixel is equal to the value of the conversion function f(D) of the prediction differential value D (i.e., the B subpixel value of the first pixel minus the average of the R subpixel value of the first pixel and the G subpixel value of the second pixel) and added with 128, and the V chrominance value of the first pixel is equal to the value of the conversion function f(D) of the prediction differential value D (i.e., the R subpixel value of the fourth pixel minus the average of the G subpixel value of the third pixel and the B subpixel value of the fourth pixel) and added with 128. These can be presented as the following equations:

$$Y_1 = 0.8588 \times R_1 + 16 \quad (22);$$

$$Y_2 = 0.8588 \times G_2 + 16 \quad (23);$$

$$Y_3=0.8588 \times G_3+16 \quad (24);$$

$$Y_4=0.8588 \times B_4+16 \quad (25);$$

$$U_1=f(B_1-0.5 \times (R_1+G_2))+128 \quad (26);$$

$$V_1=f(R_4-0.5 \times (G_3+B_4))+128 \quad (27);$$

Herein, for the equations (26) and (27), the prediction differential values D can be represented by $D=B_1-0.5 \times (R_1+G_2)$ and $D=R_4-0.5 \times (G_3+B_4)$, respectively. If the conversion is linear, the function f(D) is the equation (9). If the conversion is nonlinear, the function f(D) is the equation (10).

The above equations (22)~(27) can be known as the first stage conversion. Herein, the equations (22)~(27) also include four linear Y value ($Y_1$~$Y_4$) conversion codings (also named as linear mapping) and two linear UV value ($U_1$, $V_1$) prediction differential conversion codings (also named as linear mapping DPCM). Since the converted YUV420 format image data do not contain the $U_2$~$U_4$ and $V_2$~$V_4$ values, the image transmission of the YUV420 format image data can occupy less bandwidth and the storage thereof can use less memory space, thereby achieving the high efficient video compression and transmission.

Figure 4B:
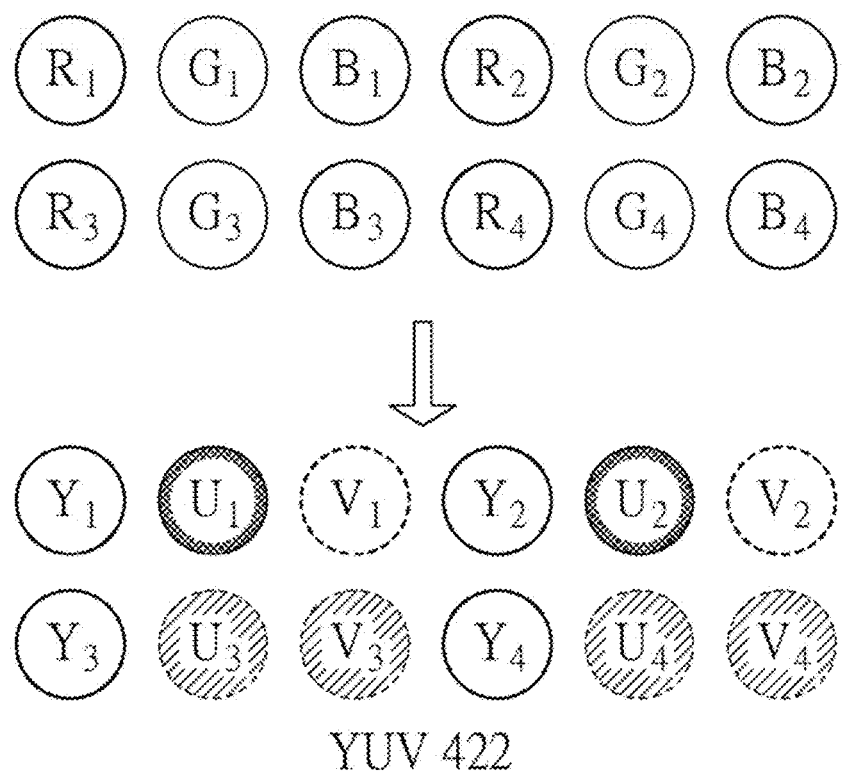
FIG. 4B is a schematic diagram showing the embodiment for converting the image data from the RGB format to the YUV422 format.

FIG. 4B is a schematic diagram showing the embodiment for converting the image data from the RGB format to the YUV422 format.

In the method for converting the image data from the RGB format to the YUV422 format, the pixel retrieving unit 11 obtains the $Y_1$~$Y_4$, $U_1$ and $V_1$ values of YUV 420 as shown in FIG. 2A and another R subpixel value ($R_3$) and another B subpixel value ($B_2$) of the four pixels, and the pixel converting unit 12 further obtains the U subpixel value ($U_2$) of the second pixel and the V subpixel value ($V_2$) of the second pixel of the YUV format according to the obtained R subpixel values, G subpixel values and B subpixel values. The equations for obtaining the $Y_1$~$Y_4$ values can be referred to the above equations (22)~(25) and $U_1$ and $V_1$ values can be referred to the above equations (26)~(27). The U chrominance value of the second pixel is calculated according to the value of the conversion function f(D) of the prediction differential value D (i.e., the R subpixel value of the third pixel minus the average of the R subpixel value of the first pixel and the G subpixel value of the third pixel), and the V chrominance value of the second pixel is calculated according to the value of the conversion function f(D) of the prediction differential value D (i.e., the B subpixel value of the second pixel minus the average of the G subpixel value of the second pixel and the B subpixel value of the fourth pixel).

In one embodiment, the U chrominance value of the second pixel is equal to the value of the conversion function f(D) of the prediction differential value D (i.e., the R subpixel value of the third pixel minus the average of the R subpixel value of the first pixel and the G subpixel value of the third pixel) and added with 128, and the V chrominance value of the second pixel is equal to the value of the conversion function f(D) of the prediction differential value D (i.e., the B subpixel value of the second pixel minus the average of the G subpixel value of the second pixel and the B subpixel value of the fourth pixel) and added with 128. These can be presented as the following equations:

$$U_2=f(R_3-0.5 \times (R_1+G_3))+128 \quad (28);$$

$$V_2=f(B_2-0.5 \times (G_2+B_4))+128 \quad (29);$$

Herein, for the equations (28) and (29), the prediction differential values D can be represented by $D=R_3-0.5 \times (R_1+G_3)$ and $D=B_2-0.5 \times (G_2+B_4)$, respectively. If the conversion is linear, the function f(D) is the equation (9). If the conversion is nonlinear, the function f(D) is the equation (10).

The above equations (15)~(16) can be known as the second stage conversion. Herein, the equations (9)~(16) also include four linear Y value ($Y_1$~$Y_4$) conversion codings (also named as linear mapping) and four linear UV values ($U_1$~$U_2$ and $V_1$~$V_2$) prediction differential conversion codings (also named as linear mapping DPCM). Since the converted YUV422 format image data do not contain the $U_3$~$U_4$ and $V_3$~$V_4$ values, the image transmission of the YUV422 format image data can occupy less bandwidth and the storage thereof can use less memory space, thereby achieving the high efficient video compression and transmission.

Figure 4C:
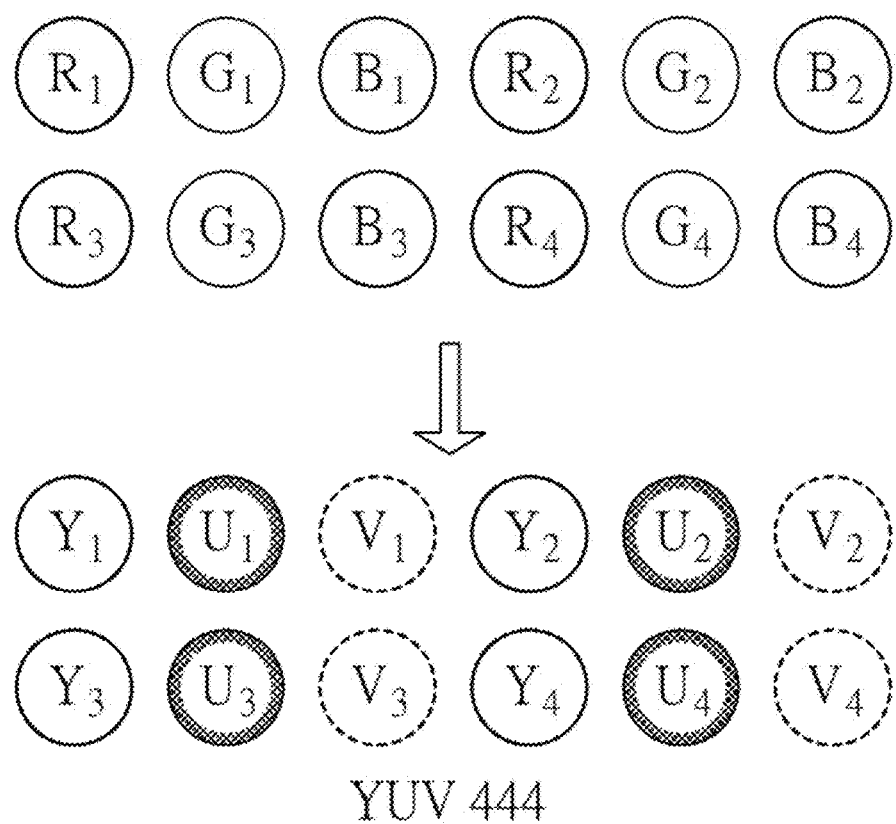
FIG. 4C is a schematic diagram showing the embodiment for converting the image data from the RGB format to the YUV444 format.

FIG. 4C is a schematic diagram showing the embodiment for converting the image data from the RGB format to the YUV444 format.

In the method for converting the image data from the RGB format to the YUV444 format, the pixel retrieving unit 11 obtains the $Y_1$~$Y_4$, $U_1$~$U_2$ and $V_1$~$V_2$ values of YUV 422 and all the residual R subpixel values, G subpixel values and B subpixel values of the four pixels (including $R_2$, $G_1$, $G_4$ and $B_3$). The pixel converting unit 12 further obtain two additional U chrominance values ($U_3$ and $U_4$) and two additional V chrominance values ($V_3$ and $V_4$) of the YUV format according to the obtained R subpixel values, G subpixel values and B subpixel values. In other words, all of the subpixel values of the YUV format are obtained. The equations for obtaining the $Y_1$~$Y_4$, $U_1$~$U_2$ and $V_1$~$V_2$ values can be referred to the above equations (22)~(29). The U chrominance value of the third pixel is calculated according to the value of the conversion function f(D) of the prediction differential value D (i.e., the G subpixel value of the first pixel minus the average of the R subpixel value of the first pixel and the B subpixel value of the first pixel), the V chrominance value of the third pixel is calculated according to the value of the conversion function f(D) of the prediction differential value D (i.e., the G subpixel value of the fourth pixel minus the average of the R subpixel value of the fourth pixel and the B subpixel value of the fourth pixel), the U subpixel value of the fourth pixel is calculated according to the value of the conversion function f(D) of the prediction differential value D (i.e., the R subpixel value of the second pixel minus the average of the B subpixel value of the first pixel and the G subpixel value of the second pixel), and the V chrominance value of the fourth pixel is calculated according to the value of the conversion function f(D) of the prediction differential value D (i.e., the B subpixel value of the third pixel minus the average of the G subpixel value of the third pixel and the R subpixel value of the fourth pixel).

In one embodiment, the U chrominance value of the third pixel is equal to the value of the conversion function f(D) of the prediction differential value D (i.e., the G subpixel value of the first pixel minus the average of the R subpixel value of the first pixel and the B subpixel value of the first pixel) and added with 128, the V chrominance value of the third pixel is equal to the value of the conversion function f(D) of the prediction differential value D (i.e., the G subpixel value of the fourth pixel minus the average of the R subpixel value of the fourth pixel and the B subpixel value of the fourth pixel) and added with 128, the U chrominance value of the fourth pixel is equal to the value of the conversion function f(D) of the prediction differential value D (i.e., the R subpixel value of the second pixel minus the average of the B subpixel value of the first pixel and the G subpixel value of the second pixel) and added with 128, and the V chrominance value of the fourth pixel is equal to the value of the conversion function f(D) of the prediction differential value D (i.e., the B subpixel value of the third pixel minus the average of the G subpixel value of the third pixel and the R subpixel value of the fourth pixel) and added with 128. These can be presented as the following equations:

$$U_3 = f(G_1 - 0.5 \times (R_1 + B_1)) + 128; \quad (30)$$

$$V_3 = f(G_4 - 0.5 \times (R_4 + B_4)) + 128; \quad (31)$$

$$U_4 = f(R_2 - 0.5 \times (B_1 + G_2)) + 128; \quad (32)$$

$$V_4 = f(B_3 - 0.5 \times (G_3 + R_4)) + 128; \quad (33)$$

Herein, for the equations (30), (31), (32) and (33), the prediction differential values D can be represented by $D = G_1 - 0.5 \times (R_1 + B_1)$, $D = G_4 - 0.5 \times (R_4 + B_4)$, $D = R_2 - 0.5 \times (B_1 + G_2)$ and $D = B_3 - 0.5 \times (G_3 + R_4)$, respectively. If the conversion is linear, the function f(D) is equal to the equation (9). If the conversion is nonlinear, the function f(D) is equal to the equation (10).

Accordingly, the conversion process of the YUV444 format includes the first stage conversion, the second stage conversion and a third stage conversion including the above equations ($U_3$, $U_4$, $V_3$ and $V_4$). Herein, the equations include four linear Y value ($Y_1 \sim Y_4$) conversion codings (also named as linear mapping) and eight UV values ($U_1 \sim U_4$ and $V_1 \sim V_4$) prediction linear differential conversion codings (also named as DPCM).

As mentioned above, the YUV420 format can be obtained by executing the first stage coding procedure, the YUV422 format can be obtained by executing the first and second stage coding procedures, and the YUV444 format can be obtained by executing all of the first, second and third stage coding procedures.

Figure 5A:
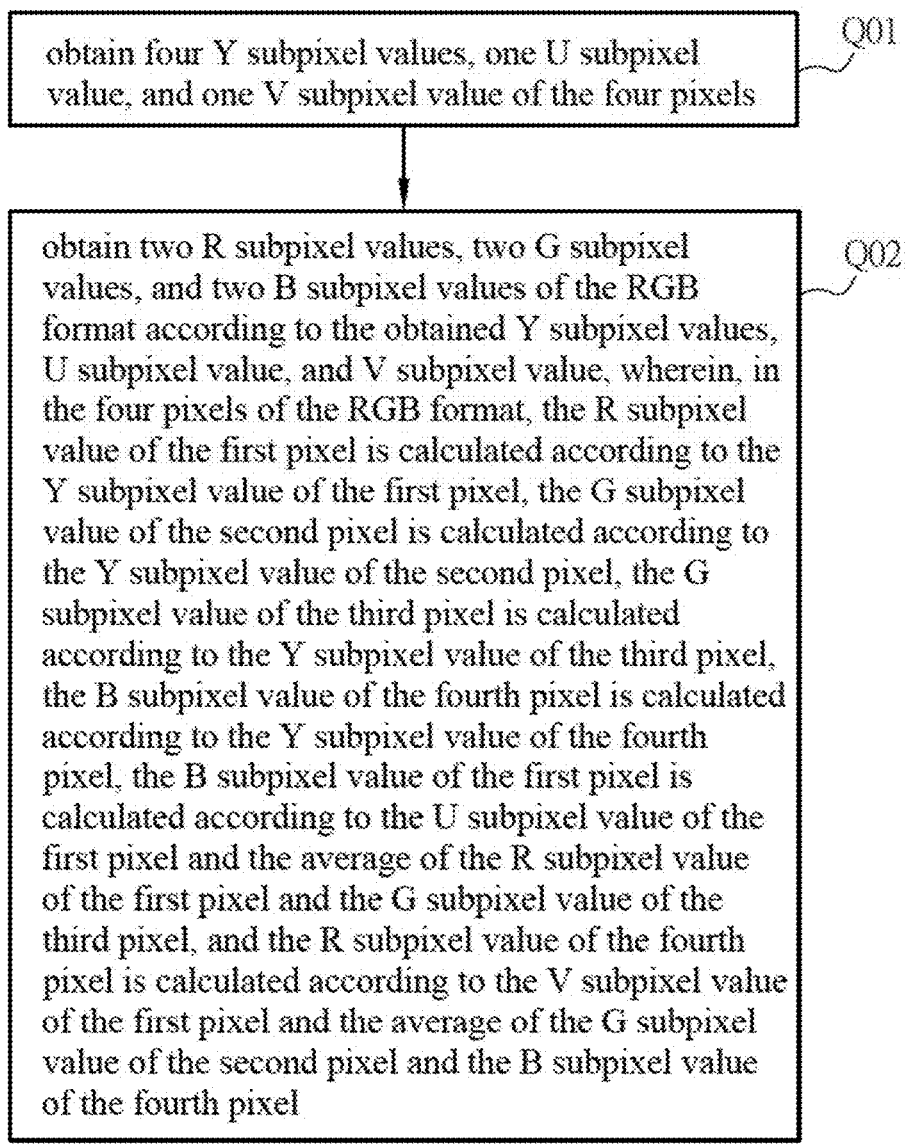
FIG. 5A is a flow chart showing a method for converting an image data from YUV format to RGB format according to an embodiment of the disclosure.
Figure 5B:
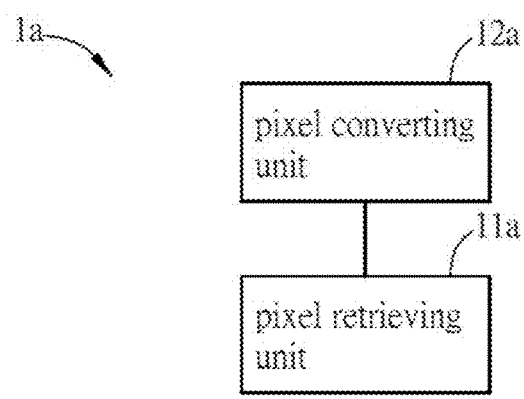
FIG. 5B is a block diagram of a conversion circuit for converting an image data from YUV format to RGB format according to an embodiment of the disclosure.

Please refer to FIGS. 5A and 5B. FIG. 5A is a flow chart showing a method for converting an image data from YUV format to RGB format according to an embodiment of the disclosure, and FIG. 5B is a block diagram of a conversion circuit 1a for converting an image data from YUV format to RGB format according to an embodiment of the disclosure. The conversion method of FIG. 5A can be named as the inverse conversion method or recovering method of the conversion method for converting an image data from RGB format to YUV format as shown in FIG. 1A.

Similarly, the image data can be, for example but not limited to, a depth frame and has YUV format, which can be converted by the conversion method and conversion circuit 1a to obtain the RGB format image data. A pixel in the YUV format includes Y subpixels (Y-luminances), U subpixels (U-chrominances) and V subpixels (V-chrominances), and a pixel in the RGB format includes R subpixels, G subpixels and B subpixels. In this embodiment, the YUV format image data include groups of adjacent four pixels. In other words, each group includes four adjacent pixels. In the following example, four pixels of every group of the image data are converted from the YUV format to the RGB format. The four pixels of each group includes a first pixel, a second pixel, a third pixel, and a fourth pixel. The first pixel is located adjacent to the second pixel and the third pixel, and the fourth pixel is also located adjacent to the second pixel and the third pixel. In addition, the Y subpixel (Y-luminance), U subpixel (U-chrominance) and V subpixel (V-chrominance) of each pixel are arranged in vertical. In other words, the Y subpixel, U subpixel and V subpixel of each pixel are arranged in the same column.

As shown in FIG. 5A, the method for converting the image data from the YUV format to the RGB format includes steps Q01 and Q02. The step Q01 is to obtain four Y luminance values, one U chrominance value, and one V chrominance value of the four pixels. The step Q02 is to obtain two R subpixel values, two G subpixel values, and two B subpixel values of the RGB format according to the obtained Y luminance values, U chrominance value, and V chrominance value. In the four pixels of the RGB format, the R subpixel value of the first pixel is calculated according to the Y luminance value of the first pixel, the G subpixel value of the second pixel is calculated according to the Y luminance value of the second pixel, the G subpixel value of the third pixel is calculated according to the Y luminance value of the third pixel, the B subpixel value of the fourth pixel is calculated according to the Y luminance value of the fourth pixel, the B subpixel value of the first pixel is calculated according to the U chrominance value of the first pixel and the average of the R subpixel value of the first pixel and the G subpixel value of the third pixel, and the R subpixel value of the fourth pixel is calculated according to the V chrominance value of the first pixel and the average of the G subpixel value of the second pixel and the B subpixel value of the fourth pixel.

Referring to FIG. 5B, the conversion circuit 1a includes a pixel retrieving unit 11a and a pixel converting unit 12a, which are electrically connected to each other. The pixel retrieving unit 11a can retrieve four Y luminance values, one U chrominance value, and one V chrominance value of four pixels of each group of the image data. The pixel converting unit 12a can obtain two R subpixel values, two G subpixel values, and two B subpixel values of the RGB format according to the retrieved Y luminance values, U chrominance value, and V chrominance value.

The pixel retrieving unit 11a can retrieve the required Y luminance values, U chrominance value, and V chrominance value for the conversion process of each group. The pixel converting unit 12a can convert the retrieved Y luminance values, U chrominance value, and V chrominance value to obtain the desired RGB format image data. In some embodiments, the pixel converting unit 12a converts four pixels of one group to obtain the RGB format image data and then stores the data to the corresponding first pixel, second pixel, third pixel and fourth pixel of the same group. Alternatively, in some embodiments, the pixel converting unit 12a may convert four pixels of all groups to obtain the RGB format image data and then stores the data to the corresponding first pixels, second pixels, third pixels and fourth pixels of all group. This disclosure is not limited. In addition, a memory unit (not shown) is provided to electrically connect with the pixel retrieving unit 11a and the pixel converting unit 12a for storing the image data before and after the conversion process. The conversion method will be described in the following embodiments.

Figure 6A:
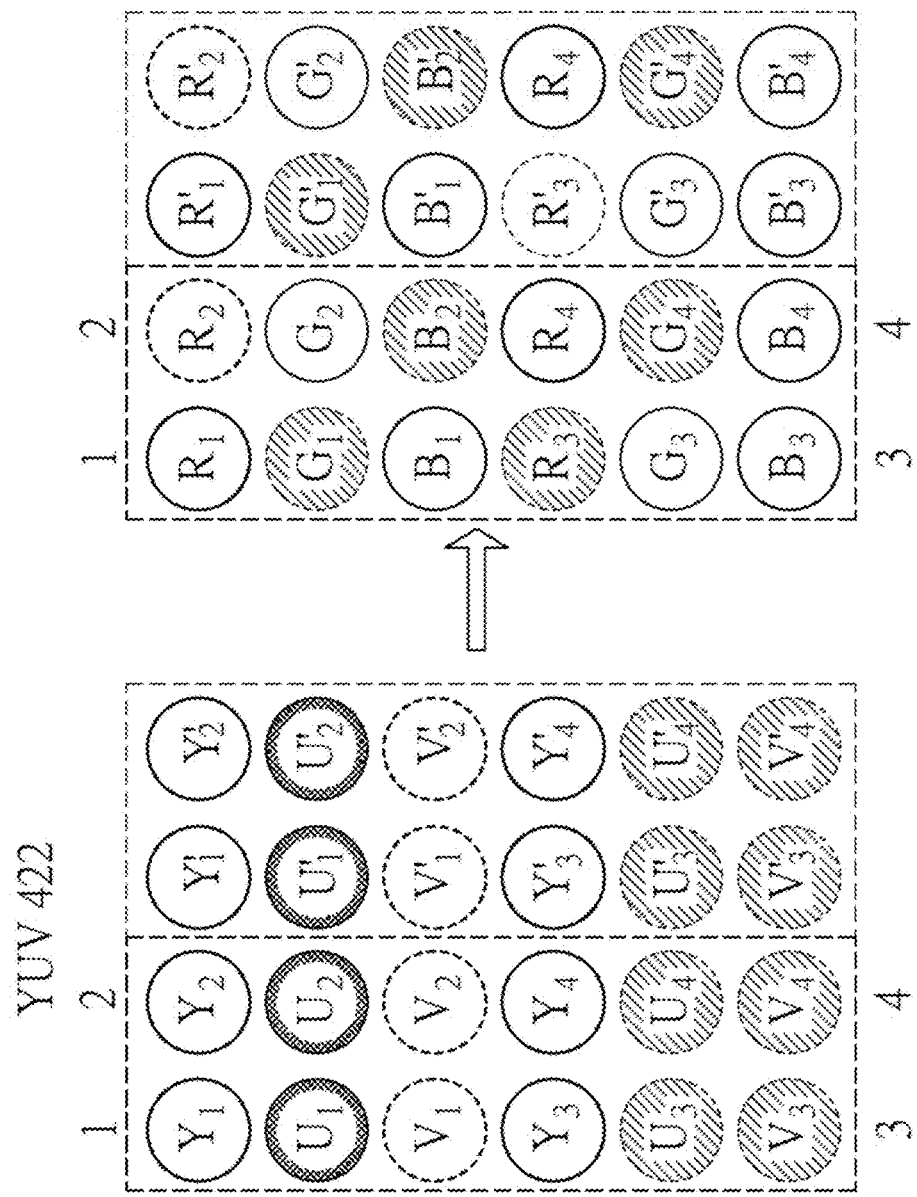
FIG. 6A is a schematic diagram showing an embodiment for converting the image data from the YUV422 format to the RGB format.

FIG. 6A is a schematic diagram showing an embodiment for converting the image data from the YUV422 format to the RGB format.

In the YUV format of this embodiment, the Y luminance, U chrominance and V chrominance of each pixel of each group are arranged vertically (in the same column). After the conversion process, the R, G and B subpixels of each pixel of the RGB format image data are also arranged vertically. As shown in FIG. 6A, the first pixel of the RGB format or YUV format includes three subpixels located at the left-top corner in vertical (represented by 1), the second pixel includes three subpixels located at the left-top corner in vertical (represented by 2), the third pixel includes three subpixels located at the left-bottom corner in vertical (represented by 3), and the fourth pixel includes three subpixels located at the left-bottom corner in vertical (represented by 4). To be noted, this disclosure is not limited thereto. In some embodiments, the positions of the first to fourth pixels can be changed, and any arrangement fitting the requirement that the first pixel is located adjacent to the second and third pixels and the fourth pixel is located adjacent to the second and third pixels can be used in this disclosure.

To be note, this embodiment is to convert the image data from the YUV422 format to the RGB format, so that, in the YUV422 format of FIG. 6A, only the subpixels $Y_1$~$Y_4$, $U_1$, $V_1$, $U_2$ and $V_2$ of the four pixels of each group have corresponding subpixel values, and the subpixels $U_3$~$U_4$ and $V_3$~$V_4$ do not have corresponding subpixel values (shown by hatchings).

In this embodiment, the method for converting the image data from the YUV422 format to the RGB format is to obtain four Y luminance values, one U chrominance value, and one V chrominance value of four pixels by the pixel retrieving unit 11a, and to obtain two R subpixel values, two G subpixel values, and two B subpixel values of the RGB format according to the obtained Y luminance values, U chrominance value, and V chrominance value by the pixel converting unit 12a.

In four pixels of the YUV422 format of one embodiment, the pixel retrieving unit 11a obtains the Y luminance values of the first to fourth pixels ($Y_1$~$Y_4$), the U chrominance value of the first pixel ($U_1$), and the V chrominance value of the first pixel ($V_1$), and then the pixel converting unit 12a obtains R subpixel values of the first and fourth pixels ($R_1$ and $R_4$), G subpixel values of the second and third pixels ($G_2$ and $G_3$), and B subpixel values of the first and fourth pixels ($B_1$ and $B_4$) according to the obtained four Y luminance values of the first to fourth pixels ($Y_1$~$Y_4$), one U chrominance 1 value of the first pixel ($U_1$), and one V chrominance value of the first pixel ($V_1$). In the four pixels of the RGB format, the R subpixel value of the first pixel is calculated according to the Y luminance value of the first pixel, the G subpixel value of the second pixel is calculated according to the Y luminance value of the second pixel, the G subpixel value of the third pixel is calculated according to the Y luminance value of the third pixel, the B subpixel value of the fourth pixel is calculated according to the Y luminance value of the fourth pixel, the B subpixel value of the first pixel is calculated according to the U chrominance value of the first pixel and the average of the R subpixel value of the first pixel and the G subpixel value of the third pixel, and the R subpixel value of the fourth pixel is calculated according to the V chrominance value of the first pixel and the average of the G subpixel value of the second pixel and the B subpixel value of the fourth pixel.

Herein, the R subpixel value of the first pixel is equal to the Y luminance value of the first pixel minus 16 and then multiplied by 1.1644, the G subpixel value of the second pixel is equal to the Y luminance value of the second pixel minus 16 and then multiplied by 1.1644, the G subpixel value of the third pixel is equal to the Y luminance value of the third pixel minus 16 and then multiplied by 1.1644, the B subpixel value of the fourth pixel is equal to the Y luminance value of the fourth pixel minus 16 and then multiplied by 1.1644, the B subpixel value of the first pixel is equal to the U chrominance value of the first pixel minus 128 and multiplied by 2.2768, and then added with the average of the R subpixel value of the first pixel and the G subpixel value of the third pixel, and the R subpixel value of the fourth pixel is equal to the V chrominance value of the first pixel minus 128 and multiplied by 2.2768, and then added with the average of the G subpixel value of the second pixel and the B subpixel value of the fourth pixel. These can be presented as the following equations:

$$R_1=1.1644\times(Y_1-16); \tag{34}$$

$$G_2=1.1644\times(Y_2-16); \tag{35}$$

$$G_3=1.1644\times(Y_3-16); \tag{36}$$

$$B_4=1.1644\times(Y_4-16); \tag{37}$$

$$B_1=2.2768\times(U_1-128)+0.5\times(R_1+G_3); \tag{38}$$

$$R_4=2.2768\times(V_1-128)+0.5\times(G_2+B_4); \tag{39}$$

The above process can be known as the first stage inverse conversion, which includes four linear inverse conversion codings ($R_1$, $G_2$, $G_3$, $B_4$) (also named as linear mapping) and two prediction linear differential inverse conversion codings ($B_1$, $R_4$) (also named as DPCM). Accordingly, when converting the image data from the YUV420 format to the RGB format, only the first stage inverse conversion is needed.

For the above equations (38)~(39) using prediction differential inverse conversion, the inverse conversion can use a linear or a nonlinear coding according to the original prediction differential linear coding or the prediction differential nonlinear coding, respectively. The general coding equation used in inverse conversion is:

$$B_1=g(U_1)+0.5\times(R_1+G_3); \tag{40}$$

$$R_4=g(V_1)+0.5\times(G_2+B_4); \tag{41}$$

Herein, g(C) is the general inverse conversion coding function of the chrominance value C. If the original packing process use the prediction differential value which is linear conversion as shown in the equation (9), the depacking of the chrominance C have to use the following linear inverse conversion coding function:

$$g(C)=2.2769\times(C-128), \tag{42}$$

And then the equations (40)~(41) are equal to the equations (38)~(39). If the original packing process use the prediction differential value which is nonlinear conversion as shown in the equation (10), the nonlinear inverse conversion coding equation of the chrominance C is a piecewise inverse function:

$$g(C) = \begin{cases} 2.3364\times(C-123)-5, & 16 \le C < 123, \\ C-128, & 123 \le C \le 133,; \\ 2.3364\times(C-133)+5, & 133 < C \le 240. \end{cases} \tag{43}$$

In addition, in this embodiment, the pixel retrieving unit 11a may further obtain another U chrominance value and another V chrominance value of the four pixels, and the pixel converting unit 12a further obtains another R subpixel value and another B subpixel value according to the obtained another U chrominance value, another V chrominance value, R subpixel values, G subpixel values and B subpixel values. Herein, the pixel retrieving unit 11a further obtains the U chrominance value of the second pixel ($U_2$) and the V chrominance value of the second pixel ($V_2$), and the pixel converting unit 12a further obtains the R subpixel value of the second pixel ($R_2$) and the B subpixel value of the third pixel ($B_3$) according to the obtained U chrominance value of the second pixel ($U_2$), V chrominance value of the second pixel ($V_2$), R subpixel value of the first pixel ($R_1$), G subpixel values of the second and third pixels ($G_2$, $G_3$), and B subpixel value of the fourth pixel ($B_4$).

Herein, the R subpixel value of the second pixel is calculated according to the U chrominance value of the second pixel and the average of the R subpixel value of the first pixel and the G subpixel value of the second pixel, and the B subpixel value of the third pixel is calculated according to the V chrominance value of the second pixel and the average of the G subpixel value of the third pixel and the B subpixel value of the fourth pixel. In more detailed, the R subpixel value of the second pixel is equal to the value of the inverse function g($U_2$) of the U chrominance value of the second pixel, and then added with the average of the R subpixel value of the first pixel and the G subpixel value of the second pixel. The B subpixel value of the third pixel is equal to the value of the inverse function g($V_2$) of the V chrominance value of the second pixel, and then added with the average of the G subpixel value of the third pixel and the B subpixel value of the fourth pixel. These can be presented as the following equations:

$$R_2 = g(U_2) + 0.5 \times (R_1 + G_2); \quad (44)$$

$$B_3 = g(V_2) + 0.5 \times (G_3 + B_4); \quad (45)$$

If the original packing process use the prediction differential value D of the linear conversion function f(D) as shown in the equation (9), the depacking process have to use the linear inverse function g(C) shown as the equation (42) where the chrominance C equals to $U_2$ or $V_2$ to calculate the linear inverse conversion. If the original packing process use the prediction differential value D of the nonlinear conversion function f(D) as shown in the equation (10), the depacking process have to use the nonlinear inverse function g(C) shown in the equation (43) where the chrominance C to calculate the nonlinear inverse conversion.

This process can be known as the second stage inverse conversion, which includes two prediction linear differential conversion codings ($R_2$, $B_3$). Accordingly, when converting the image data from the YUV422 format to the RGB format, the first stage inverse conversion and the second stage inverse conversion are needed.

Since the YUV422 format does not contain the $U_3 \sim U_4$ and $V_3 \sim V_4$ values, the four pixels of each group of the obtained RGB format image data may lack the $G_1$, $B_2$, $R_3$ and $G_4$ subpixels. In order to add the lacked $G_1$, $B_2$, $R_3$ and $G_4$ subpixel values in the four pixel of each group, in one embodiment, the pixel converting unit 12a further utilizes an average interpolation decoding method to obtain the unknown values ($G_1$, $B_2$, $R_3$ and $G_4$ subpixel values) (the first method). In this case, the G subpixel value of the first pixel is equal to the average of the subpixel values of all subpixels adjacent to the G subpixel of the first pixel, the B subpixel value of the second pixel is equal to the average of the subpixel values of all subpixels adjacent to the B subpixel of the second pixel, the R subpixel value of the third pixel is equal to the average of the subpixel values of all subpixels adjacent to the R subpixel of the third pixel, and the G subpixel value of the fourth pixel is equal to the average of the subpixel values of all subpixels adjacent to the G subpixel of the fourth pixel.

In more detailed, if the unknown subpixel is located at the edge of the image data, the subpixel value of the unknown subpixel is the average of the subpixel values of three subpixels adjacent to the unknown subpixel, and if the unknown subpixel is not located at the edge of the image data, the subpixel value of the unknown subpixel is the average of the subpixel values of four subpixels adjacent to the unknown subpixel. As shown in FIG. 6A.

$$G_1 = 0.3333(R_1 + G_2 + B_1) \quad (46);$$

$$B_2 = 0.250(B_1 + R_4 + B'_1 + G_2) \quad (47);$$

$$R_3 = 0.3333(B_1 + R_4 + G_3) \quad (48);$$

$$G_4 = 0.250(R_4 + G_3 + B_4 + G'_3) \quad (49);$$

$$G'_1 = 0.250(R'_1 + G_2 + B'_1 + G'_2) \quad (50);$$

and so on

The above mentioned average interpolation decoding method can fill the lacked subpixel values ($G_1$, $B_2$, $R_3$, $G_4$) of the four pixels of every group in the RGB format, thereby completing the RGB format image data.

Figure 6B:
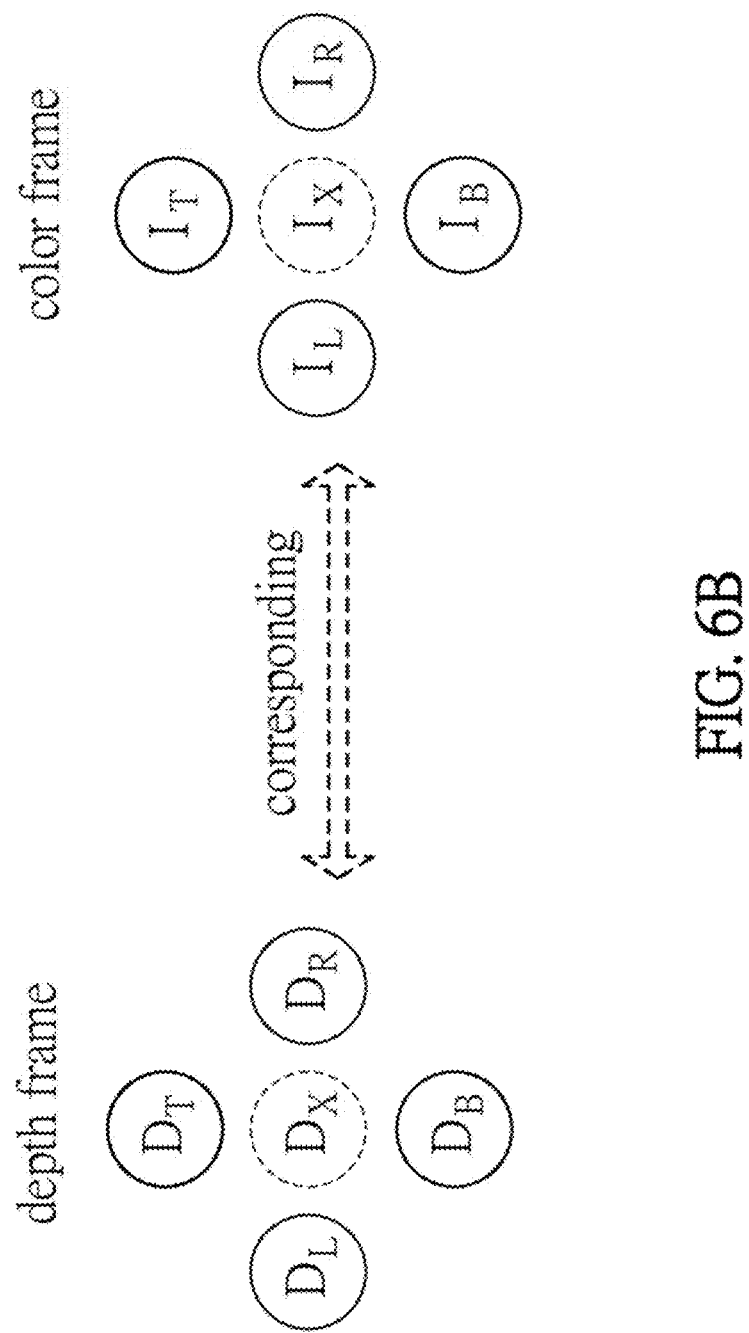
FIG. 6B is a schematic diagram showing the corresponding relationships between pixels in the depth frame and their counterparts in the color frame according to one embodiment.

In another embodiment, the pixel converting unit 12a may utilize another average interpolation decoding method to obtain the known values ($G_1$, $B_2$, $R_3$, $G_4$) (the second method). Herein, according to a color frame (2D image data), the 3D image generating system can generate the depth frame corresponding to the color frame. Accordingly, the depth frame and the color fame have a corresponding relation. In other words, the subpixel of one position of the depth frame can be corresponding to the subpixel of the corresponding position of the color frame. As shown in FIG. 6B, the $D_X$ of the depth frame is corresponding to the $I_X$ of the color frame, the $D_T$ of the depth frame is corresponding to the $I_T$ of the color frame, and so on.

In another embodiment, the G subpixel value of the first pixel is calculated according to all subpixel values of the subpixels adjacent to the G subpixel of the first pixel in the depth frame and all subpixel values of the subpixels adjacent to the subpixel in the color frame corresponding to the G subpixel of the first pixel. The B subpixel value of the second pixel is calculated according to all subpixel values of the subpixels adjacent to the B subpixel of the second pixel in the depth frame and all subpixel values of the subpixels adjacent to the subpixel in the color frame corresponding to the B subpixel of the second pixel. The R subpixel value of the third pixel is calculated according to all subpixel values of the subpixels adjacent to the R subpixel of the third pixel in the depth frame and all subpixel values of the subpixels adjacent to the subpixel in the color frame corresponding to the R subpixel of the third pixel. The G subpixel value of the fourth pixel is calculated according to all subpixel values of the subpixels adjacent to the G subpixel of the fourth pixel in the depth frame and all subpixel values of the subpixels adjacent to the subpixel in the color frame corresponding to the G subpixel of the fourth pixel.

Referring to FIG. 6A, the calculation procedure of, for example, $G_1$ ($G_1$ is a subpixel located at the edge) is shown as follow. The median of the subpixels $R_1$, $B_1$ and $G_2$ adjacent to $G_1$ is D (D=median($R_1,B_1,G_2$)). Cost_color is defined as [$|I_{R1}-I_{G1}|,|I_{B1}-I_{G1}|,|I_{G2}-I_{G1}|$]. Herein, I is the subpixel value of the color frame corresponding to the depth frame. Cost_depth is defined as [$|R_1-D|,|B_1-D|,|G_2-D|$]. Assuming Cost_color sequentially obtains the values 1a, 1b and 1c, and Cost_depth sequentially obtains the values 2a, 2b and 2c, the values of Cost_color is correspondingly added with the values of Cost_depth so as to obtain three values (1a+1b), (2a+2b) and (3a+3b), and the median of the obtained three values is D'. If (1a+1b)≤D', the subpixel value $R_1$ is remained; if not, the subpixel value $R_1$ is discarded. If (2a+2b)≤D', the subpixel value $B_1$ is remained; if not, the subpixel value $B_1$ is discarded. If $(3a+3b) \leq D'$, the subpixel value $G_2$ is remained; if not, the subpixel value $G_2$ is discarded. Afterwards, the remained subpixel values are averaged to obtain the $G_1$ subpixel value.

The calculation procedure of, for example, $B_2$ ($B_2$ is an internal subpixel) is shown as follow. The median of the subpixels $G_2$, $R_4$, $B_1$ and $B_1'$ adjacent to $B_2$ is D (D=median $(G_2,R_4,B_1,B_1')$). Cost_color is defined as [$|I_{G2}-I_{B2}|,|I_{R4}-I_{B2}|,|I_{B1}-I_{B2}|,|I_{B1'}-I_{B2}|$]. Cost_depth is defined as [$|G_2-D|$, $|R_4-D|,|B_1-D|,|B_1'-D|$]. Assuming Cost_color sequentially obtains the values 1a, 1b, 1c and 1d, and Cost_depth sequentially obtains the values 2a, 2b, 2c and 2d, the values of Cost_color is correspondingly added with the values of Cost_depth so as to obtain four values (1a+1b), (2a+2b), (3a+3b) and (4a+4b), and the median of the obtained four values is D'. Similarly, if (1a+1b), (2a+2b), (3a+3b) or $(4a+4b) \leq D'$, the subpixel value is remained; if not, the subpixel value is discarded. Afterwards, the remained subpixel values are averaged to obtain the $B_2$ subpixel value. In addition, the unknown $R_3$ and $G_4$ subpixel values can also be obtained as the similar way, thereby obtaining the four unknown values ($G_1$, $B_2$, $R_3$ and $G_4$).

Figure 6C:
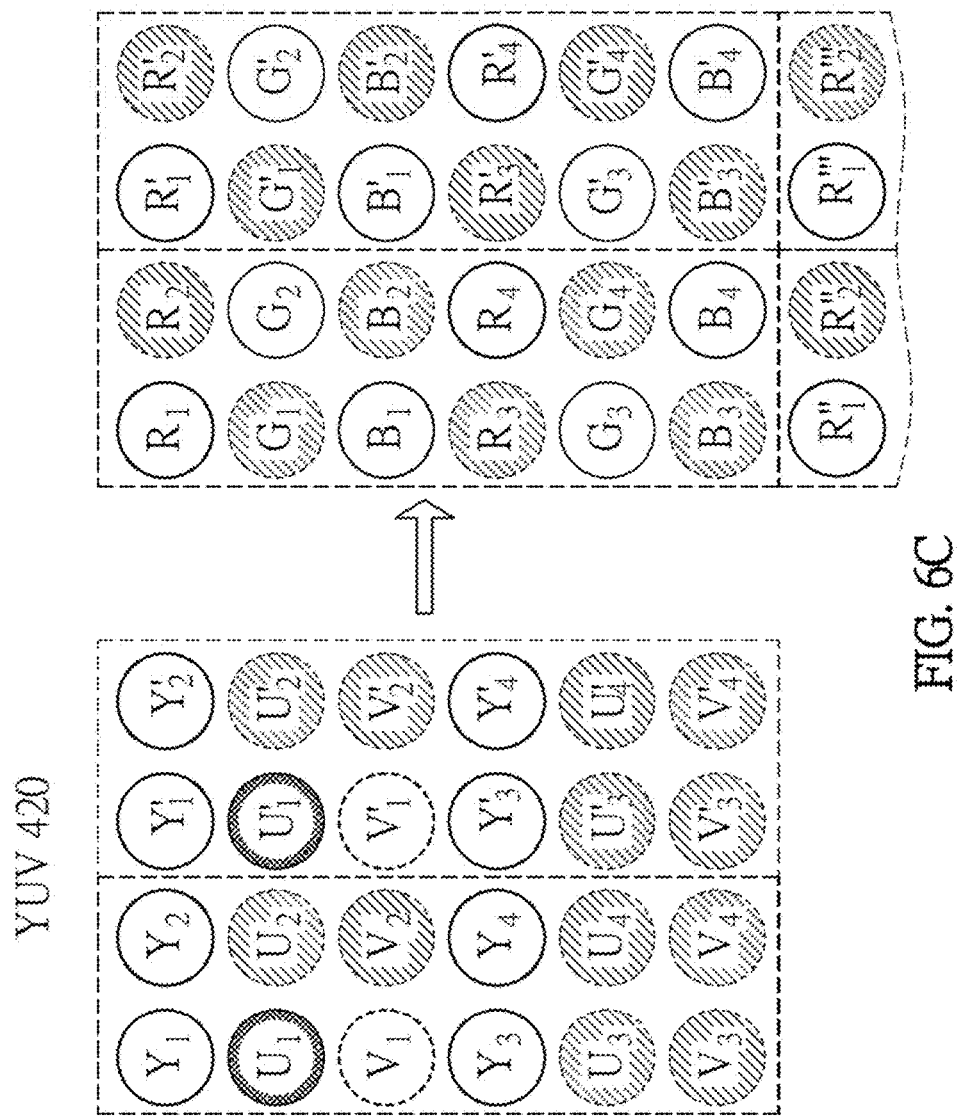
FIG. 6C is a schematic diagram showing an embodiment for converting the image data from the YUV420 format to the RGB format.

FIG. 6C is a schematic diagram showing an embodiment for converting the image data from the YUV420 format to the RGB format.

In the YUV420 format of this embodiment, the Y, U and V subpixels of each pixel of each group are arranged vertically (in the same column). After the conversion process, the R, G and B subpixels of each pixel of the RGB format image data are also arranged vertically. In some embodiments, the positions of the first to fourth pixels can be changed, and any arrangement fitting the requirement that the first pixel is located adjacent to the second and third pixels and the fourth pixel is located adjacent to the second and third pixels can be used in this disclosure.

To be note, this embodiment is to convert the image data from the YUV420 format the RGB format, so that, in the YUV420 format of FIG. 6C, only the subpixels $Y_1 \sim Y_4$ luminances, $U_1$ chrominance and $V_1$ chrominance of the four pixels of each group have corresponding subpixel values, and the subpixels $U_2 \sim U_4$ chrominance and $V_2 \sim V_4$ chrominance do not have corresponding subpixel values (shown by hatchings). Besides, the four pixels of each group further lack of the subpixels $G_1$, $B_2$, $R_3$ and $G_4$ as well as the subpixels $R_2$ and $B_3$. Accordingly, the unknown subpixel values ($G_1$, $B_2$, $R_3$ and $G_4$) can be obtained by the average interpolation decoding method (the above equations (46)~(50)). Moreover, the other two unknown subpixel values ($R_2$ and $B_3$) can also be obtained by the same average interpolation decoding method.

In the first average interpolation decoding method of one embodiment, the R subpixel value of the second pixel is equal to the average of all subpixel values of the subpixels adjacent to the R subpixel of the second pixel, and the B subpixel value of the third pixel is equal to the average of all subpixel values of the subpixels adjacent to the B subpixel of the third pixel.

Similarly, if the known subpixel is located at the edge of the image data, the subpixel value of the unknown subpixel is the average of the subpixel values of three subpixels adjacent to the unknown subpixel, and if the unknown subpixel is not located at the edge of the image data, the subpixel value of the unknown subpixel is the average of the subpixel values of four subpixels adjacent to the unknown subpixel. As shown in FIG. 6C.

$$R_2 = 0.3333(R_1 + G_2 + R'_1);$$

$$B_3 = 0.3333(G_3 + B_4 + R''_1);$$

$$B'_3 = 0.250(G'_3 + B_4 + R'''_1 + B'_4);$$

and so on.

Alternatively, in the second average interpolation decoding method of another embodiment, the R subpixel value of the second pixel is calculated according to all subpixel values of the subpixels adjacent to the R subpixel of the second pixel in the depth frame and all subpixel values of the subpixels adjacent to the subpixel in the color frame corresponding to the R subpixel of the second pixel, and the B subpixel value of the third pixel is calculated according to all subpixel values of the subpixels adjacent to the B subpixel of the third pixel in the depth frame and all subpixel values of the subpixels adjacent to the subpixel in the color frame corresponding to the B subpixel of the third pixel. The calculation method can be referred to the above embodiments, so the detailed description thereof will be omitted.

In order to fill the lacked R, G and B subpixel values of the four pixels of each group, the pixel converting unit 12a may utilize the two average interpolation decoding methods to obtain the six known values ($G_1$, $B_2$, $R_3$, $G_4$, $R_2$ and $B_3$).

In another embodiment for converting the image data from YUV444 format to RGB format, since all Y luminance values, U and V chrominance values of the four pixels of each group of the YUV444 format image data are obtained, the pixel retrieving unit 11a further needs to obtain the residual U chrominance values ($U_3$, $U_4$) and the residual V chrominance values ($V_3$, $V_4$), except the $R_1$, $G_2$, $G_3$, $B_4$, $B_1$, $R_4$, $R_2$ and $B_3$ subpixel values (which can be obtained in the (inverse) conversion of YUV 422 format). The pixel converting unit 12a further obtains the residual R subpixel value ($R_3$), the residual G subpixel values ($G_1$ and $G_4$) and the residual B subpixel value ($B_2$) according to the obtained U chrominance values, V chrominance values, R, G and B subpixel values. The G subpixel value of the first pixel is calculated by the U chrominance value of the third pixel and the average of the R subpixel value of the first pixel and the B subpixel value of the first pixel, the G subpixel value of the fourth pixel is calculated by the V chrominance value of the third pixel and the average of the R subpixel value of the fourth pixel and the B subpixel value of the fourth pixel, the R subpixel value of the third pixel is calculated by the U chrominance value of the fourth pixel and the average of the B subpixel value of the first pixel and the G subpixel value of the third pixel, and the B subpixel value of the second pixel is calculated by the V chrominance value of the fourth pixel and the average of the G subpixel value of the second pixel and the R subpixel value of the fourth pixel.

In one embodiment, the G subpixel value of the first pixel is equal to the value of the inverse function $g(U_3)$ of the U chrominance value of the third pixel and then added with the average of the R subpixel value of the first pixel and the B subpixel value of the first pixel. The G subpixel value of the fourth pixel is equal to the V chrominance value of the third pixel minus 128 and multiplied by 2.2768, and then added with the average of the R subpixel value of the fourth pixel and the B subpixel value of the fourth pixel, the R subpixel value of the third pixel is equal to the value of the inverse function $g(U_3)$ of the U chrominance value of the fourth pixel and then added with the average of the B subpixel value of the first pixel and the G subpixel value of the third pixel. The B subpixel value of the second pixel is equal to the value of the inverse function $g(V_4)$ of the V chrominance value of the fourth pixel and then added with the average of the G subpixel value of the second pixel and the R subpixel value of the fourth pixel. These can be presented as the following equations:

$$G_1 = g(U_3) + 0.5 \times (R_1 + B_1);$$

$$G_4 = g(V_3) + 0.5 \times (R_4 + B_4);$$

$$R_3 = g(U_4) + 0.5 \times (B_1 + G_3);$$

$$B_2 = g(V_4) + 0.5 \times (G_2 + R_4);$$

If the original packing process use the prediction differential value D of the linear conversion function f(D) as shown in the equation (9), the depacking process have to use the linear inverse function g(C) shown as the equation (42) where the chrominance C equals to $U_3$, $V_3$, $U_4$ or $V_4$ to calculate the linear inverse conversion. If the original packing process use the prediction differential value D of the nonlinear conversion function f(D) as shown in the equation (10), the depacking process have to use the nonlinear inverse function g(C) shown in the equation (43) where the chrominance C to calculate the nonlinear inverse conversion.

This process can be known as the third stage inverse conversion, which includes four prediction linear differential conversion codings ($G_1$, $G_4$, $R_3$ and $B_2$). Accordingly, when converting the image data from the YUV444 format to the RGB format, the first stage inverse conversion, the second stage inverse conversion and the third stage inverse conversion are needed.

Figure 7:
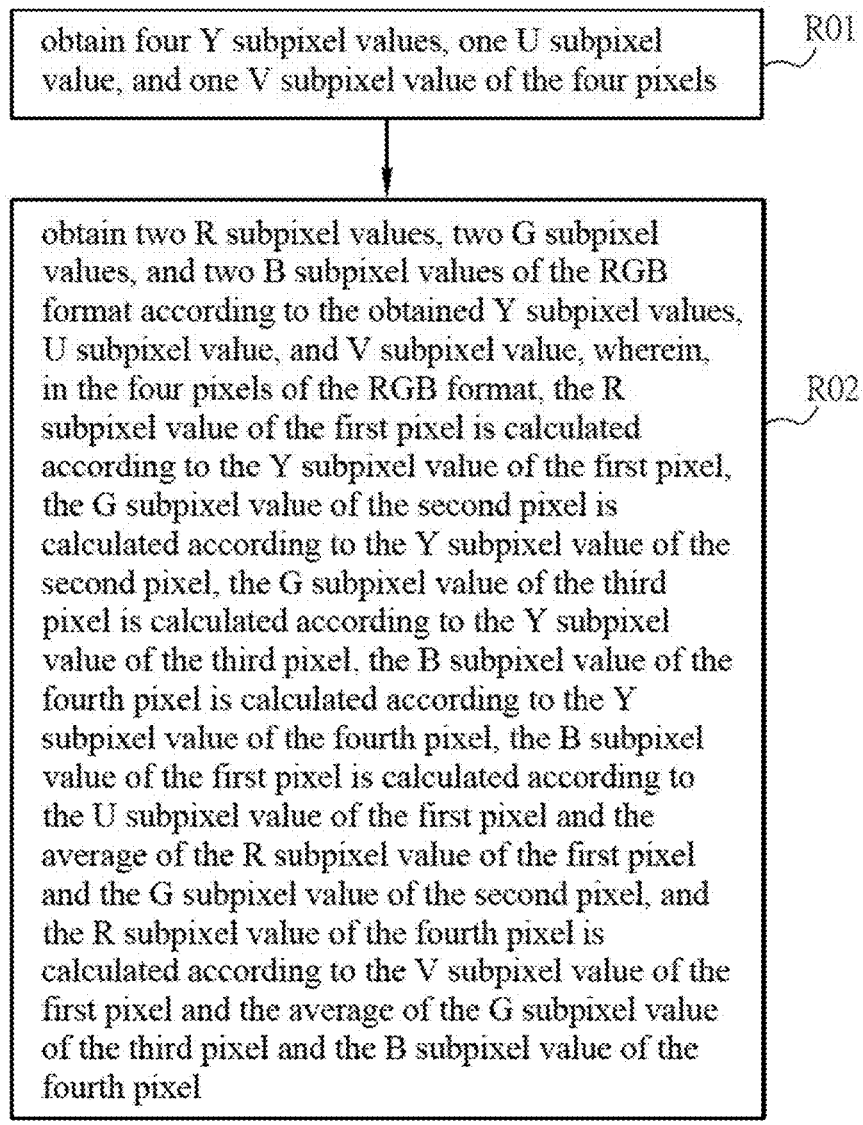
FIG. 7 is a flow chart showing a method of an embodiment for converting the image data from the YUV format to the RGB format.

Please refer to FIGS. 5B and 7. FIG. 7 is a flow chart showing a method of an embodiment for converting the image data from the YUV format to the RGB format.

The image data can be, for example but not limited to, a depth frame and has YUV format, which can be converted by the conversion circuit 1a to obtain the RGB format image data. In this embodiment, the YUV format image data include groups of adjacent four pixels. In other words, each group includes four adjacent pixels. In the following example, four pixels of every group of the image data are converted from the RGB format to the YUV format. The four pixels of each group includes a first pixel, a second pixel, a third pixel, and a fourth pixel. The first pixel is located adjacent to the second pixel and the third pixel, and the fourth pixel is also located adjacent to the second pixel and the third pixel. In addition, the Y luminance, U chrominance and V chrominance of each pixel are arranged in horizontal. In other words, the Y luminance, U chrominance and V chrominance of each pixel are arranged in the same row (horizontal direction).

As shown in FIG. 7, the method for converting the image data from the YUV format to the RGB format includes steps R01 and R02. The step R01 is to obtain four Y luminance values, one U chrominance value, and one V chrominance value of the four pixels. The step R02 is to obtain two R subpixel values, two G subpixel values, and two B subpixel values of the RGB format according to the obtained Y luminance values, U chrominance value, and V chrominance value. In the four pixels of the RGB format, the R subpixel value of the first pixel is calculated according to the Y luminance value of the first pixel, the G subpixel value of the second pixel is calculated according to the Y luminance value of the second pixel, the G subpixel value of the third pixel is calculated according to the Y luminance value of the third pixel, the B subpixel value of the fourth pixel is calculated according to the Y luminance value of the fourth pixel, the B subpixel value of the first pixel is calculated according to the U chrominance value of the first pixel and the average of the R subpixel value of the first pixel and the G subpixel value of the second pixel, and the R subpixel value of the fourth pixel is calculated according to the V chrominance value of the first pixel and the average of the G subpixel value of the third pixel and the B subpixel value of the fourth pixel.

The pixel retrieving unit 11a can retrieve four Y luminance values, one U chrominance value, and one V chrominance value of the four pixels of each group of the image data. The pixel converting unit 12a can obtain two R subpixel values, two G subpixel values, and two B subpixel values of the RGB format according to the retrieved Y luminance values, U chrominance value, and V chrominance value. In one embodiment, the conversion circuit 1a may include, for example, an adder, a subtractor, a multiplier, and/or a divider.

The pixel retrieving unit 11a can retrieve the required Y luminance values, U chrominance value, and V chrominance value for the conversion process of each group. The pixel converting unit 12a can convert the retrieved Y luminance values, U chrominance value, and V chrominance value to obtain the desired RGB format image data. The conversion method will be described in the following embodiments.

Figure 8A:
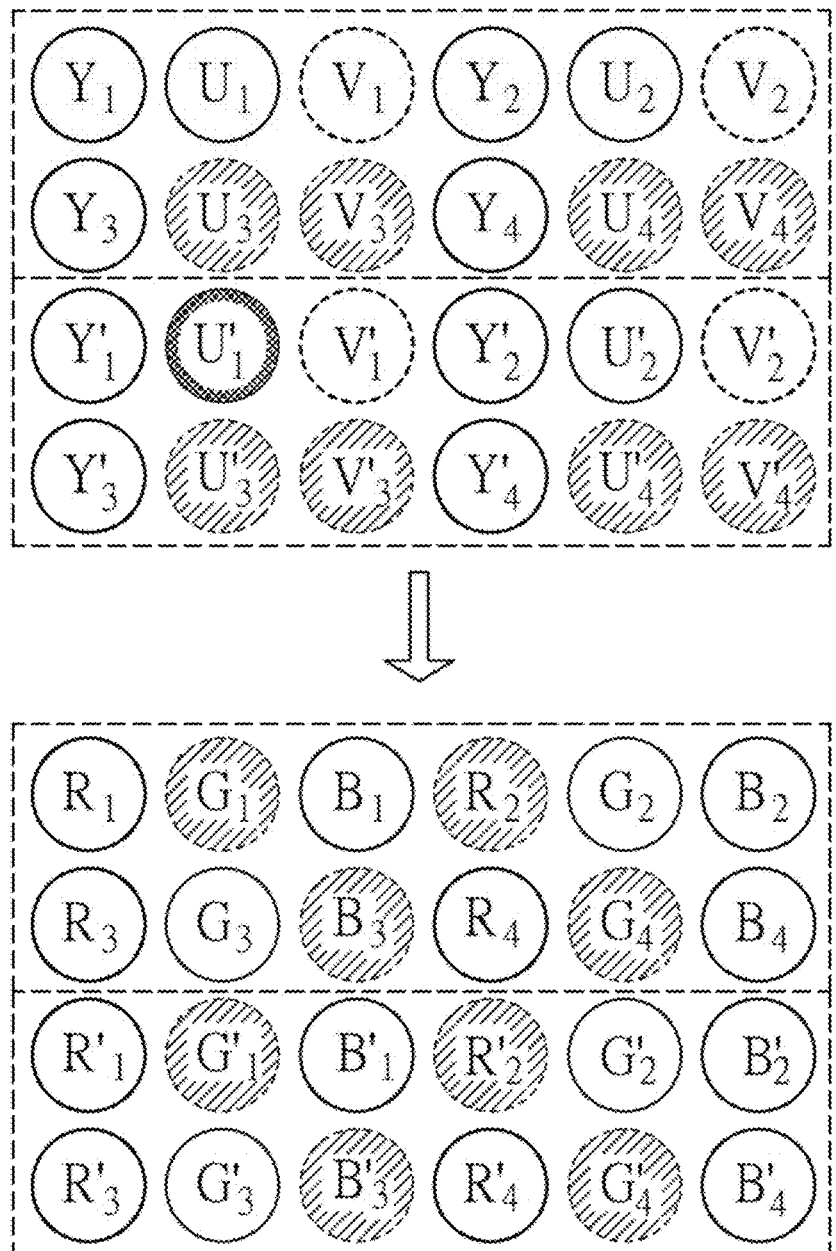
FIG. 8A is a schematic diagram showing an embodiment for converting the image data from the YUV422 format to the RGB format.

FIG. 8A is a schematic diagram showing an embodiment for converting the image data from the YUV422 format to the RGB format. In the YUV422 format of this embodiment, the Y luminance, U chrominance and V chrominance of each pixel of each group are arranged horizontally (in the same row). After the conversion process, the R, G and B subpixels of each pixel of the RGB format image data are also arranged horizontally. In some embodiments, the positions of the first to fourth pixels can be changed, and any arrangement fitting the requirement that the first pixel is located adjacent to the second and third pixels and the fourth pixel is located adjacent to the second and third pixels can be used in this disclosure.

To be note, this embodiment is to convert the image data from the YUV422 format to the RGB format, so that, in the YUV422 format of FIG. 8A, only the subpixels $Y_1$~$Y_4$ luminances, $U_1$, $V_1$, $U_2$ and $V_2$ chrominances of the four pixels of each group have corresponding subpixel values, and the subpixels $U_3$~$U_4$ and $V_3$~$V_4$ do not have corresponding subpixel values (shown by hatchings).

In this embodiment, the method for converting the image data from the YUV format to the RGB format is to obtain four Y luminance values, one U chrominance value, and one V chrominance value of four pixels by the pixel retrieving unit 11a, and to obtain two R subpixel values, two G subpixel values, and two B subpixel values of the RGB format according to the obtained Y luminance values, U chrominance value, and V chrominance value by the pixel converting unit 12a. In four pixels of the YUV422 format of one embodiment, the pixel retrieving unit 11a obtains the Y luminance values of the first to fourth pixels ($Y_1$~$Y_4$), the U chrominance value of the first pixel ($U_1$), and the V chrominance value of the first pixel ($V_1$), and then the pixel converting unit 12a obtains R subpixel values of the first and fourth pixels ($R_1$ and $R_4$), G subpixel values of the second and third pixels ($G_2$ and $G_3$), and B subpixel values of the first and fourth pixels ($B_1$ and $B_4$) according to the obtained four Y luminance values of the first to fourth pixels ($Y_1$~$Y_4$), one U chrominance value of the first pixel ($U_1$), and one V chrominance value of the first pixel ($V_1$). In the four pixels of the RGB format, the R subpixel value of the first pixel is calculated according to the Y luminance value of the first pixel, the G subpixel value of the second pixel is calculated according to the Y luminance value of the second pixel, the G subpixel value of the third pixel is calculated according to the Y luminance value of the third pixel, the B subpixel value of the fourth pixel is calculated according to the Y luminance value of the fourth pixel, the B subpixel value of the first pixel is calculated according to the U chrominance value of the first pixel and the average of the R subpixel value of the first pixel and the G subpixel value of the second pixel, and the R subpixel value of the fourth pixel is calculated according to the V chrominance value of the first pixel and the average of the G subpixel value of the third pixel and the B subpixel value of the fourth pixel.

Herein, the R subpixel value of the first pixel is equal to the Y luminance value of the first pixel minus 16 and then multiplied by 1.1644, the G subpixel value of the second pixel is equal to the Y luminance value of the second pixel minus 16 and then multiplied by 1.1644, the G subpixel value of the third pixel is equal to the Y luminance value of the third pixel minus 16 and then multiplied by 1.1644, the B subpixel value of the fourth pixel is equal to the Y luminance value of the fourth pixel minus 16 and then multiplied by 1.1644. The B subpixel value of the first pixel is equal to the value of the inverse function $g(U_1)$ of the U chrominance value of the first pixel and then added with the average of the R subpixel value of the first pixel and the G subpixel value of the second pixel, and the R subpixel value of the fourth pixel is equal to the value of the inverse function $g(V_1)$ of the V chrominance value of the first pixel and then added with the average of the G subpixel value of the third pixel and the B subpixel value of the fourth pixel. These can be presented as the following equations:

$$R_1=1.1644\times(Y_1-16);$$

$$G_2=1.1644\times(Y_2-16);$$

$$G_3=1.1644\times(Y_3-16);$$

$$B_4=1.1644\times(Y_4-16);$$

$$B_1=g(U_1)+0.5\times(R_1+G_2);$$

$$R_4=g(V_1)+0.5\times(G_3+B_4);$$

If the original packing process use the prediction differential value D of the linear conversion function f(D) as shown in the equation (9), the depacking process have to use the linear inverse function g(C) shown as the equation (42) where the chrominance C equals to $U_1$ or $V_1$ to calculate the linear inverse conversion. If the original packing process use the prediction differential value D of the nonlinear conversion function f(D) as shown in the equation (10), the depacking process have to use the nonlinear inverse function g(C) shown in the equation (43) where the chrominance C to calculate the nonlinear inverse conversion.

The above process can be known as the first stage inverse conversion, which includes four linear inverse conversion codings ($R_1$, $G_2$, $G_3$, $B_4$) (also named as linear mapping) and two prediction linear differential inverse conversion codings ($B_1$, $R_4$) (also named as DPCM). Accordingly, when converting the image data from the YUV420 format to the RGB format, only the first stage inverse conversion is needed.

In addition, in this embodiment, the pixel retrieving unit 11a may further obtain another U chrominance value and another V chrominance value of the four pixels, and the pixel converting unit 12a further obtains another R subpixel value and another B subpixel value according to the obtained another U chrominance value, another V chrominance value, R subpixel values, G subpixel values and B subpixel values. Herein, the pixel retrieving unit 11a further obtains the U chrominance value of the second pixel ($U_2$) and the V chrominance value of the second pixel ($V_2$), and the pixel converting unit 12a further obtains the R subpixel value of the third pixel ($R_3$) and the B subpixel value of the second pixel ($B_2$) according to the obtained U chrominance value of the second pixel ($U_2$), V chrominance value of the second pixel ($V_2$), R subpixel value of the first pixel ($R_1$), G subpixel values of the second and third pixels ($G_2$, $G_3$), and B subpixel value of the fourth pixel ($B_4$). Herein, the R subpixel value of the third pixel is calculated according to the U chrominance value of the second pixel and the average of the R subpixel value of the first pixel and the G subpixel value of the third pixel, and the B subpixel value of the second pixel is calculated according to the V chrominance value of the second pixel and the average of the G subpixel value of the second pixel and the B subpixel value of the fourth pixel.

In more detailed, the R subpixel value of the third pixel is equal to the value of the inverse function $g(U_2)$ of the U chrominance value of the second pixel and then added with the average of the R subpixel value of the first pixel and the G subpixel value of the third pixel. The B subpixel value of the second pixel is equal to the value of the inverse function $g(V_2)$ of the V chrominance value of the second pixel and then added with the average of the G subpixel value of the second pixel and the B subpixel value of the fourth pixel. These can be presented as the following equations:

$$R_3=g(U_2)+0.5\times(R_1+G_3);$$

$$B_2=g(V_2)+0.5\times(G_2+B_4);$$

If the original packing process use the prediction differential value D of the linear conversion function f(D) as shown in the equation (9), the depacking process have to use the linear inverse function g(C) shown as the equation (42) where the chrominance C equals to $U_2$ or $V_2$ to calculate the linear inverse conversion. If the original packing process use the prediction differential value D of the nonlinear conversion function f(D) as shown in the equation (10), the depacking process have to use the nonlinear inverse function g(C) shown in the equation (43) where the chrominance C to calculate the nonlinear inverse conversion.

This process can be known as the second stage inverse conversion, which includes two prediction linear differential conversion codings ($R_3$, $B_2$). Accordingly, when converting the image data from the YUV422 format to the RGB format, the first stage inverse conversion and the second stage inverse conversion are needed.

Since the YUV422 format does not contain the $U_3 \sim U_4$ and $V_3 \sim V_4$ values, the four pixels of each group of the obtained RGB format image data may lack the $G_1$, $B_3$, $R_2$ and $G_4$ subpixels. In order to add the lacked R, B and G subpixel values in the four pixel of each group, in one embodiment, the pixel converting unit 12a further utilizes an average interpolation decoding method to obtain the unknown values ($G_1$, $B_3$, $R_2$ and $G_4$ subpixel values) (the first method). In this case, the G subpixel value of the first pixel is equal to the average of the subpixel values of all subpixels adjacent to the G subpixel of the first pixel, the B subpixel value of the third pixel is equal to the average of the subpixel values of all subpixels adjacent to the B subpixel of the third pixel, the R subpixel value of the second pixel is equal to the average of the subpixel values of all subpixels adjacent to the R subpixel of the second pixel, and the G subpixel value of the fourth pixel is equal to the average of the subpixel values of all subpixels adjacent to the G subpixel of the fourth pixel.

In more detailed, if the unknown subpixel is located at the edge of the image data, the subpixel value of the unknown subpixel is the average of the subpixel values of three subpixels adjacent to the unknown subpixel, and if the unknown subpixel is not located at the edge of the image data, the subpixel value of the unknown subpixel is the average of the subpixel values of four subpixels adjacent to the unknown subpixel. As shown in FIG. 8A.

$G_1 = 0.3333(R_1 + G_3 + B_1);$ $B_3 = 0.250(B_1 + G_3 + B'_1 + R_4);$ $R_2 = 0.3333(B_1 + G_2 + R_4);$ $G_4 = 0.250(R_4 + G'_2 + B_4 + G_2);$ $G'_1 = 0.250(R'_1 + G'_3 + B'_1 + G_3);$ and so on.

The above mentioned average interpolation decoding method can fill the lacked subpixel values ($G_1$, $B_3$, $R_2$, $G_4$) of the four pixels of every group in the RGB format, thereby completing the RGB format image data.

In another embodiment, the pixel converting unit 12a may utilize another average interpolation decoding method to obtain the known values ($G_1$, $B_3$, $R_2$, $G_4$) (the second method). Herein, according to a color frame (2D image data), the 3D image generating system can generate the depth frame corresponding to the color frame. Accordingly, the depth frame and the color fame have a corresponding relation. In other words, the subpixel of one position of the depth frame can be corresponding to the subpixel of the corresponding position of the color frame.

In the pixel converting unit 12a, the G subpixel value of the first pixel is calculated according to all subpixel values of the subpixels adjacent to the G subpixel of the first pixel in the depth frame and all subpixel values of the subpixels adjacent to the subpixel in the color frame corresponding to the G subpixel of the first pixel. The B subpixel value of the third pixel is calculated according to all subpixel values of the subpixels adjacent to the B subpixel of the third pixel in the depth frame and all subpixel values of the subpixels adjacent to the subpixel in the color frame corresponding to the B subpixel of the third pixel. The R subpixel value of the second pixel is calculated according to all subpixel values of the subpixels adjacent to the R subpixel of the second pixel in the depth frame and all subpixel values of the subpixels adjacent to the subpixel in the color frame corresponding to the R subpixel of the second pixel. The G subpixel value of the fourth pixel is calculated according to all subpixel values of the subpixels adjacent to the G subpixel of the fourth pixel in the depth frame and all subpixel values of the subpixels adjacent to the subpixel in the color frame corresponding to the G subpixel of the fourth pixel. The calculation method can be referred to the above embodiments, so the detailed descriptions thereof will be omitted.

Figure 8B:
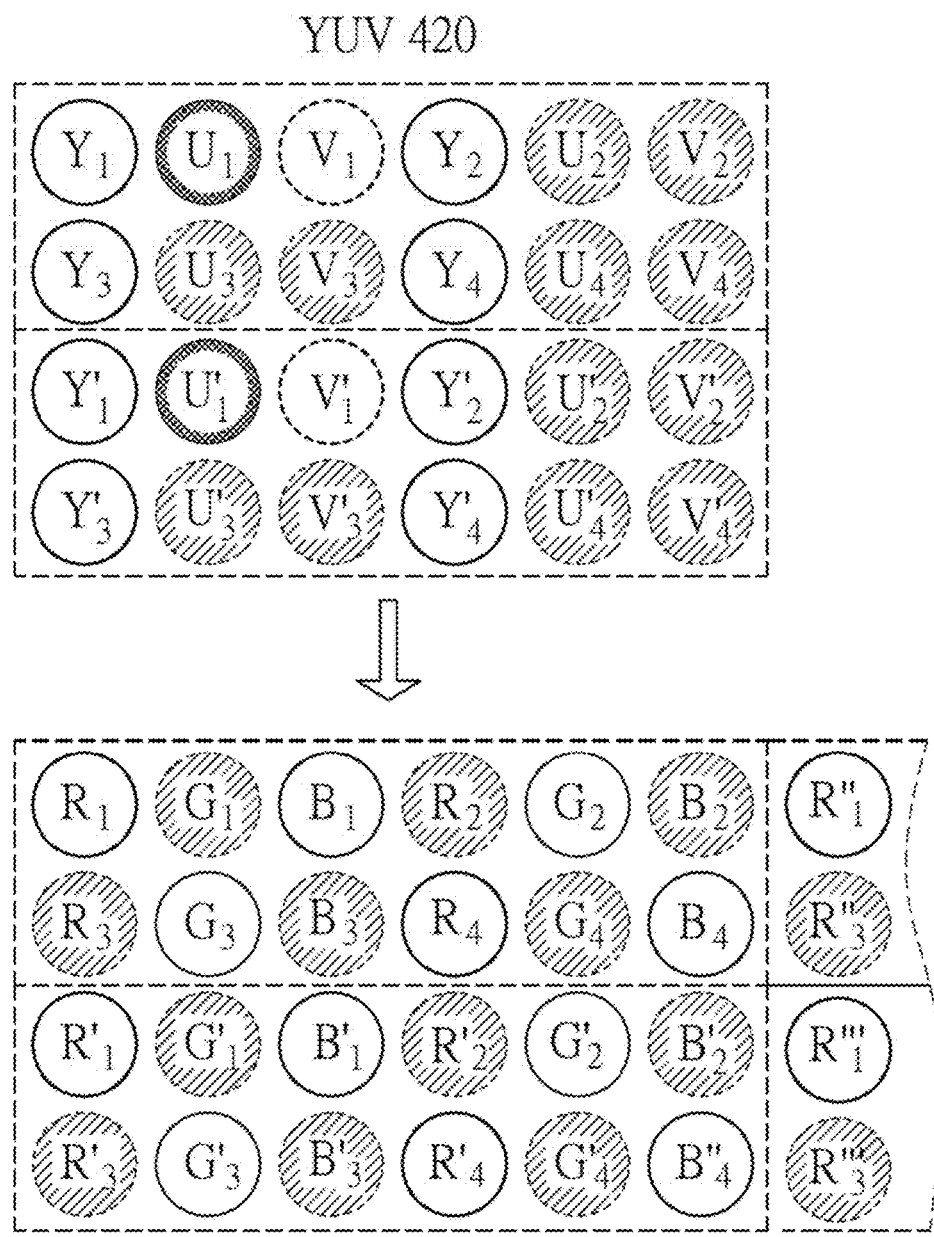
FIG. 8B is a schematic diagram showing an embodiment for converting the image data from the YUV420 format to the RGB format.

FIG. 8B is a schematic diagram showing an embodiment for converting the image data from the YUV420 format to the RGB format.

This embodiment is to convert the image data from the YUV420 format the RGB format, so that, in the YUV420 format of FIG. 8B, only the subpixels $Y_1$~$Y_4$, $U_1$ and $V_1$ of the four pixels of each group have corresponding subpixel values, and the subpixels $U_2$~$U_4$ and $V_2$~$V_4$ do not have corresponding subpixel values (shown by hatchings). Besides, the four pixels of each group further lack of the subpixels $G_1$, $B_3$, $R_2$ and $G_4$ (as FIG. 8A) as well as the subpixels $R_3$ and $B_2$. Accordingly, the unknown subpixel values ($G_1$, $B_3$, $R_2$ and $G_4$) can be obtained by the above-mentioned two average interpolation decoding methods. Moreover, the other two unknown subpixel values ($R_3$ and $B_2$) can also be obtained by the same average interpolation decoding methods. In the first average interpolation decoding method of one embodiment, the R subpixel value of the third pixel is equal to the average of all subpixel values of the subpixels adjacent to the R subpixel of the third pixel, and the B subpixel value of the second pixel is equal to the average of all subpixel values of the subpixels adjacent to the B subpixel of the second pixel. As shown in FIG. 8B.

$R_3 = 0.3333(R_1 + G_3 + R'_1);$ $B_2 = 0.3333(G_2 + B_4 + R''_1);$ $B'_2 = 0.250(G'_2 + B''_4 + R'''_1 + B_4);$ and so on.

In the second average interpolation decoding method of another embodiment, the R subpixel value of the third pixel is calculated according to all subpixel values of the subpixels adjacent to the R subpixel of the third pixel in the depth frame and all subpixel values of the subpixels adjacent to the subpixel in the color frame corresponding to the R subpixel of the third pixel, and the B subpixel value of the second pixel is calculated according to all subpixel values of the subpixels adjacent to the B subpixel of the second pixel in the depth frame and all subpixel values of the subpixels adjacent to the subpixel in the color frame corresponding to the B subpixel of the second pixel. The calculation method can be referred to the above embodiments, so the detailed description thereof will be omitted.

In order to fill the lacked R, G and B subpixel values of the four pixels of each group, the pixel converting unit 12a may utilize the two average interpolation decoding methods to obtain the six known values ($G_1$, $B_3$, $R_2$, $G_4$, $R_3$ and $B_2$).

In another embodiment for converting the image data from YUV444 format to RGB format, since all Y, U and V chrominance values of the four pixels of each group of the YUV444 format image data are obtained, the pixel retrieving unit 11a needs to obtain the $R_1$, $G_2$, $G_3$, $B_4$, $B_1$, $R_4$, $R_3$ and $B_2$ subpixel values (the first and second stage revere conversion processes for YUV 422 format) and the residual U chrominance values ($U_3$, $U_4$) and the residual V chrominance values ($V_3$, $V_4$). The pixel converting unit 12a further obtains the residual R subpixel value ($R_2$), the residual G subpixel values ($G_1$ and $G_4$) and the residual B subpixel value ($B_3$) according to the obtained U, V, R, G and B subpixel values. The G subpixel value of the first pixel is calculated by the U chrominance value of the third pixel and the average of the R subpixel value of the first pixel and the B subpixel value of the first pixel, the G subpixel value of the fourth pixel is calculated by the V chrominance value of the third pixel and the average of the R subpixel value of the fourth pixel and the B subpixel value of the fourth pixel, the R subpixel value of the second pixel is calculated by the U chrominance value of the fourth pixel and the average of the B subpixel value of the first pixel and the G subpixel value of the second pixel, and the B subpixel value of the third pixel is calculated by the V chrominance value of the fourth pixel and the average of the G subpixel value of the third pixel and the R subpixel value of the fourth pixel.

In one embodiment, the G subpixel value of the first pixel is equal to the value of the inverse function g($U_3$) of the U chrominance value of the third pixel and then added with the average of the R subpixel value of the first pixel and the B subpixel value of the first pixel. The G subpixel value of the fourth pixel is equal to the value of the inverse function g(V₃) of the V chrominance value of the third pixel and then added with the average of the R subpixel value of the fourth pixel and the B subpixel value of the fourth pixel. The R subpixel value of the second pixel is equal to the value of the inverse function g(U₄) of the U chrominance value of the fourth pixel and then added with the average of the B subpixel value of the first pixel and the G subpixel value of the second pixel. The B subpixel value of the third pixel is equal to the value of the inverse function g(V₄) of the V chrominance value of the fourth pixel and then added with the average of the G subpixel value of the third pixel and the R subpixel value of the fourth pixel. These can be presented as the following equations:

$$G_1 = g(U_3) + 0.5 \times (R_1 + B_1);$$

$$G_4 = g(V_3) + 0.5 \times (R_4 + B_4);$$

$$R_2 = g(U_4) + 0.5 \times (B_1 + G_2);$$

$$B_3 = g(V_4) + 0.5 \times (G_3 + R_4);$$

If the original packing process use the prediction differential value D of the linear conversion function f(D) as shown in the equation (9), the depacking process have to use the linear inverse function g(C) shown as the equation (42) where the chrominance C equals to $U_3$, $V_3$, $U_4$ or $V_4$ to calculate the linear inverse conversion. If the original packing process use the prediction differential value D of the nonlinear conversion function f(D) as shown in the equation (10), the depacking process have to use the nonlinear inverse function g(C) shown in the equation (43) where the chrominance C to calculate the nonlinear inverse conversion.

This process can be known as the third stage inverse conversion, which includes four prediction linear differential conversion codings ($G_1$, $G_4$, $R_2$ and $B_3$). Accordingly, when converting the image data from the YUV444 format to the RGB format, the first stage inverse conversion, the second stage inverse conversion and the third stage inverse conversion are needed.

In addition, the technology of this disclosure and a conventional technology are applied to convert the image data of a depth frame from the RGB format to the YUV420 format, and then convert the image data from the YUV420 format to the RGB format. In one embodiment, the PSNR (peak signal to noise ratio) of the obtained depth frame processed by the conventional technology is 48.9643, the PSNR of the obtained depth frame processed by the technology of the disclosure with the first average interpolation decoding method is 48.9046, and the PSNR of the obtained depth frame processed by the technology of the disclosure with the second average interpolation decoding method is 50.3002. In another embodiment, the PSNR of the obtained depth frame processed by the conventional technology is 32.8386, the PSNR of the obtained depth frame processed by the technology of the disclosure with the first average interpolation decoding method is 35.7320, and the PSNR of the obtained depth frame processed by the technology of the disclosure with the second average interpolation decoding method is 36.4299. The results indicate that the PSNR of the disclosure are obviously higher, which can obtain better image quality.

Figure 9A:
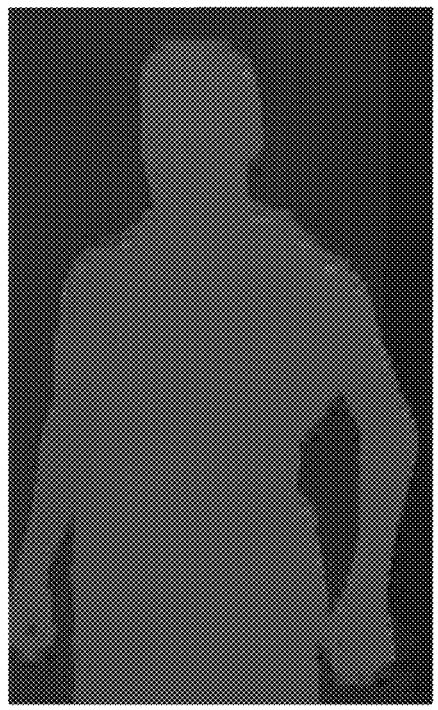
FIGS. 9A and 10A are schematic diagrams showing the depth frame that is processed by the conventional technology for converting from the RGB format to the YUV420 format and then converting from the YUV420 format to the RGB format.
Figure 9B:
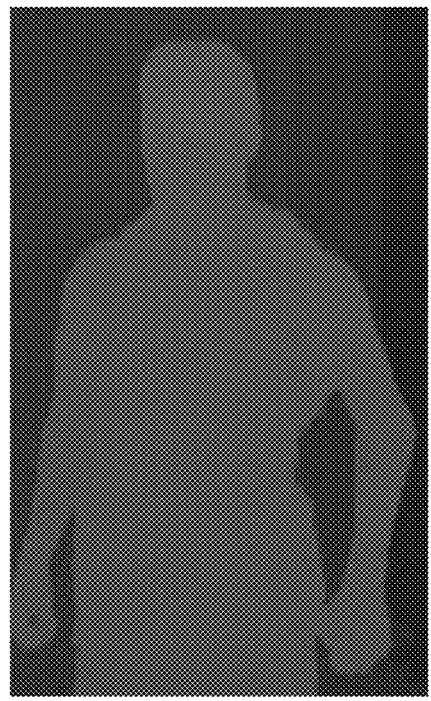
FIGS. 9B, 9C, 10B and 10C are schematic diagrams showing the depth frame that is processed by the technology of the disclosure for converting from the RGB format to the YUV420 format and then converting from the YUV420 format to the RGB format.
Figure 9C:
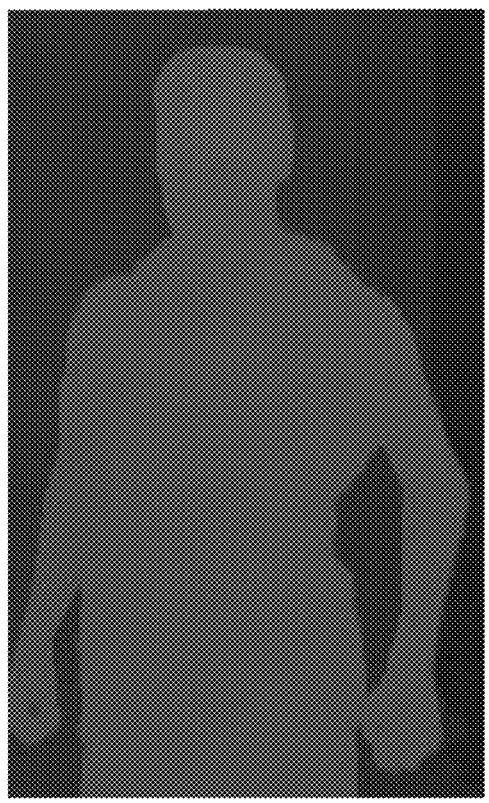
Figure 10A:
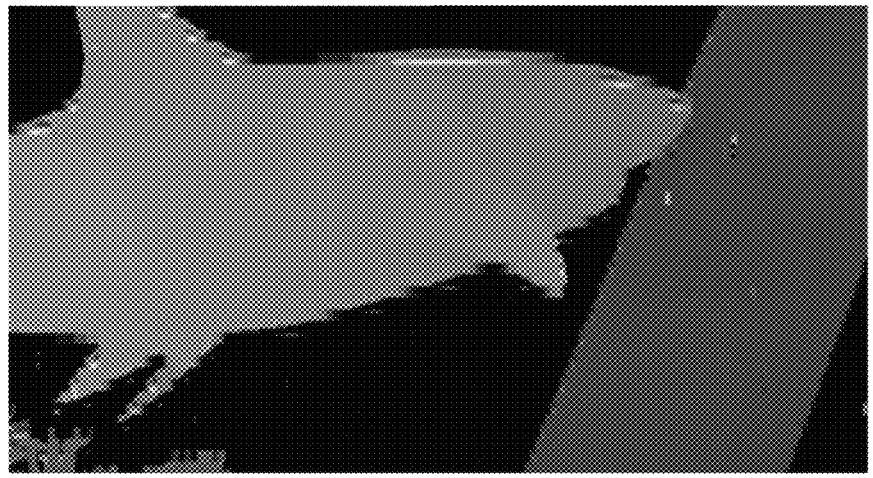
Figure 10B:
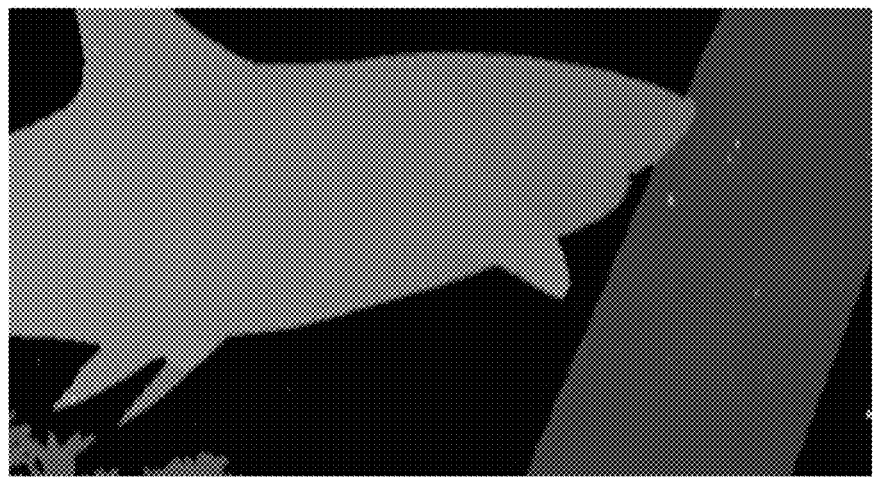
Figure 10C:
Figure 11A:
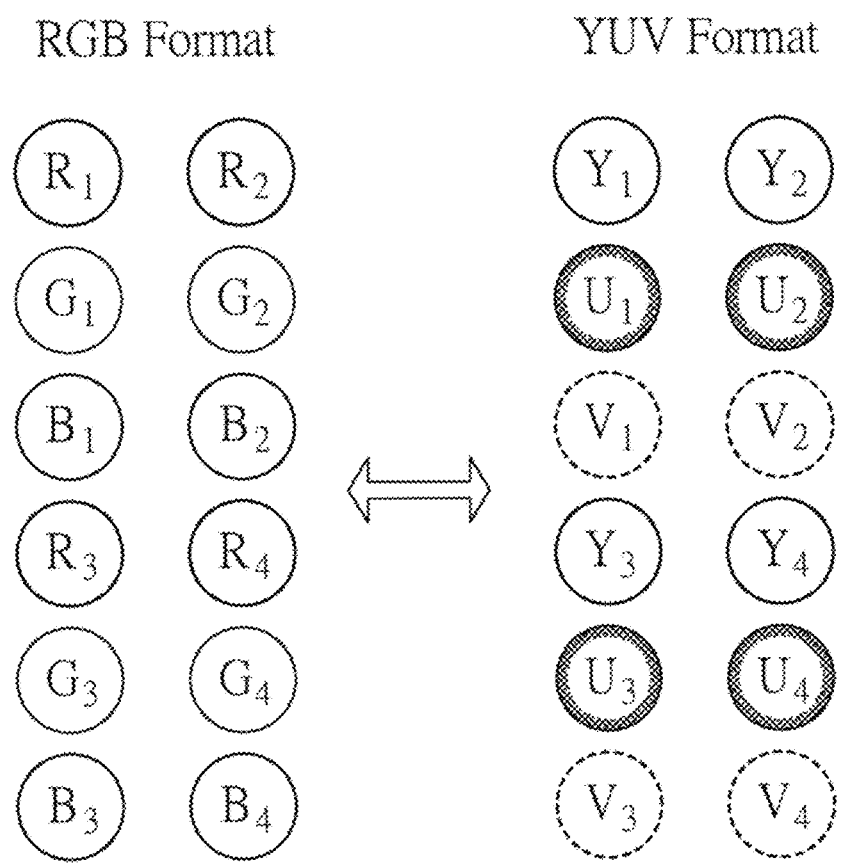
FIGS. 11A and 11B show the conversions of the depth vertical pixels and the depth horizontal pixels.
Figure 11B:
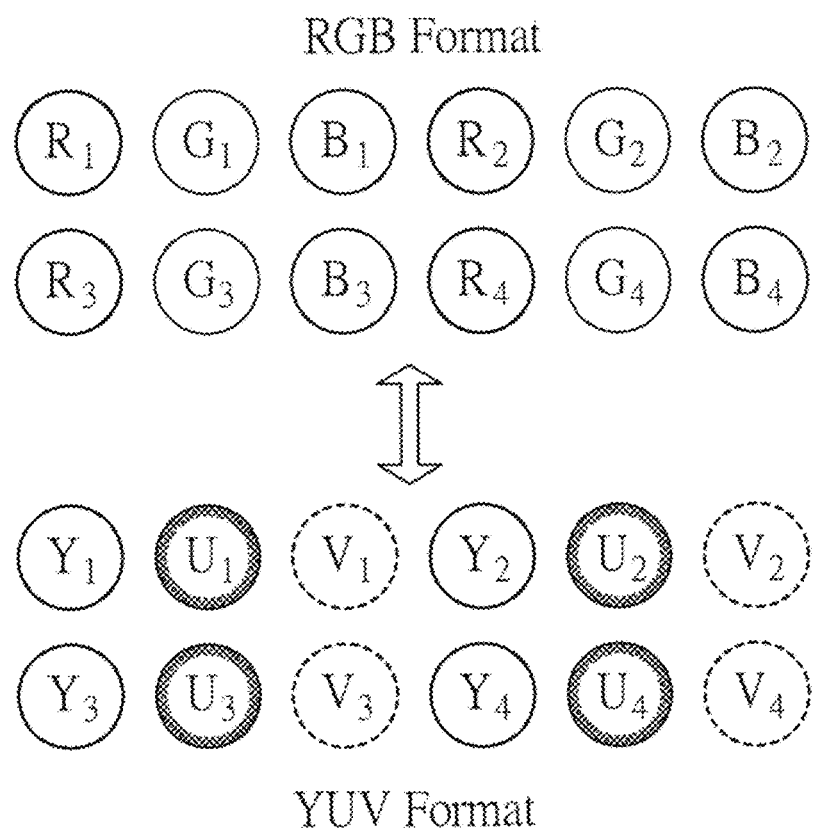
Figure 12A:
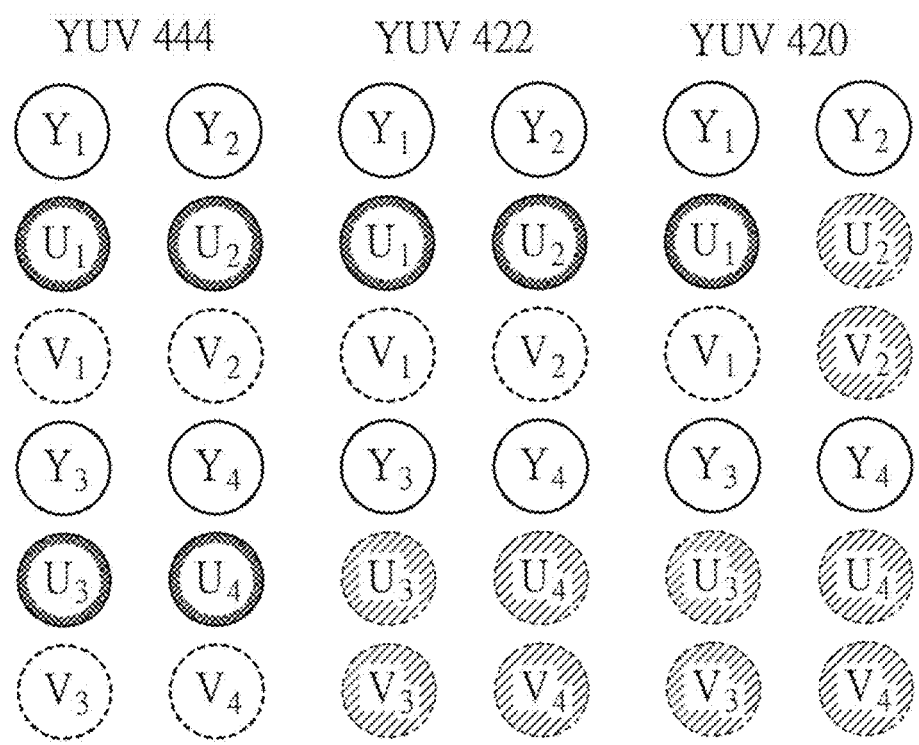
FIGS. 12A and 12B show the YUV444 format, YUV422 format, and YUV420 format of the depth vertical and horizontal packages, respectively.
Figure 12B:
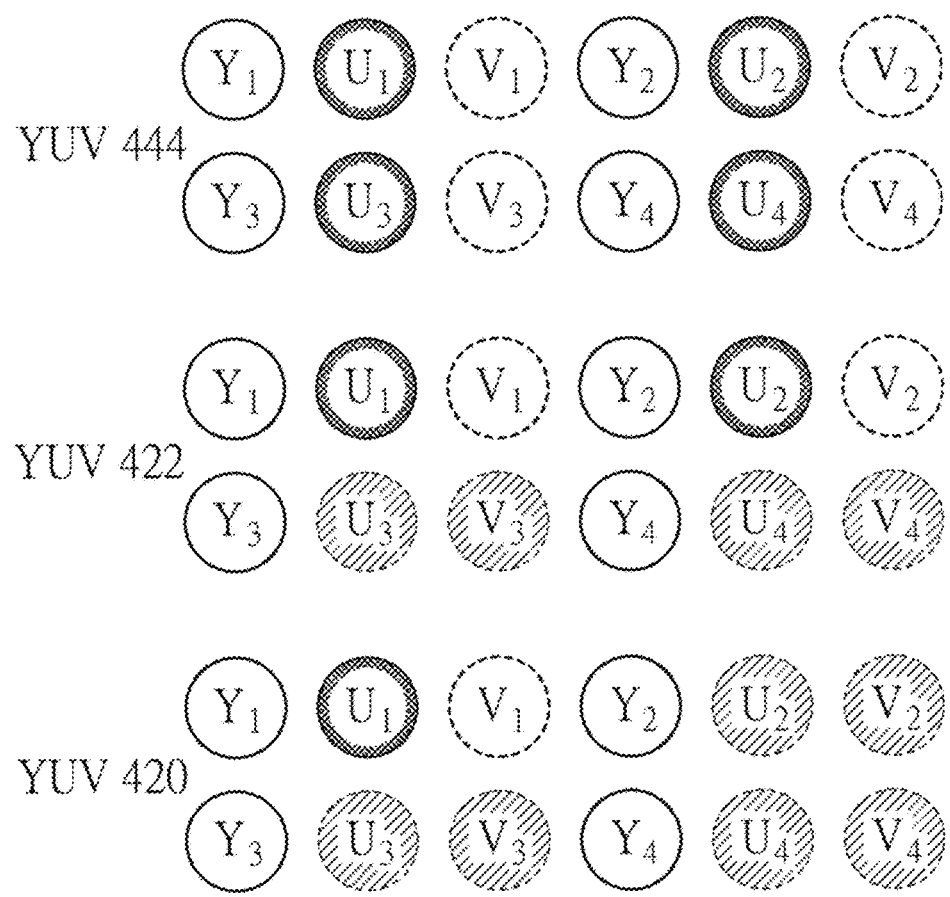

FIGS. 9A and 10A are schematic diagrams showing the depth frame that is processed by the conventional technology for converting from the RGB format to the YUV420 format and then converting from the YUV420 format to the RGB format. FIGS. 9B, 9C, 10B and 10C are schematic diagrams showing the depth frame that is processed by the technology of the disclosure for converting from the RGB format to the YUV420 format and then converting from the YUV420 format to the RGB format. In FIGS. 9B and 10B, the six unknown subpixel values are obtained by the first average interpolation decoding method. In FIGS. 9C and 10C, the six unknown subpixel values are obtained by the second average interpolation decoding method.

As shown in FIGS. 9A and 10A, the position with large depth gap (i.e. the area having dramatic depth change) (e.g. the edge of the right arm) shows obvious white dots and saw-tooth shapes. As shown in FIGS. 9B and 10B and FIGS. 9C and 10C, the position with large depth gap as mentioned above shows no white dot and has smoother lines, thereby having less distortion. Accordingly, the conversion and inverse conversion methods and circuits of this disclosure can obtain the unknown lost points by the gradual prediction decoding method and average interpolation decoding method. Compared with the conventional art, the present disclosure can obtain better RGB format conversion so as to obtain a better original depth frame.

Accordingly, the conversion methods and circuits, as illustrated by some embodiments of the present invention, are different from those conventional methods in that the methods and circuits, as illustrated by some embodiments of the present invention, do not utilize all three variables (i.e., all three sub-pixel values) of the RGB format or YUV format during conversion, but they still have the advantages of high compression rate, small data amount and high transferring efficiencies, as well as to be able to lower the loading to the transmission apparatus and occupy less bandwidth.

Also, compared with the conventional art, the inverse conversion methods and circuits, as illustrated by some embodiments of the present invention, can recover the conversed image data to obtain a better original depth frame and therefore to improves the distortion at the area having large (or dramatical) depth gap.

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A mapping method applied in depacking a depth frame to convert from a YUV format to a RGB format, wherein one pixel in the YUV format includes Y luminance, U chrominance and V chrominance, and one pixel in the RGB format includes a R subpixel, a G subpixel and a B subpixel, the depth frame in YUV format include at least four adjacent pixels in one group and the Y luminance, U chrominance and V chrominance of each pixel are arranged in vertical, theses four pixels in each group includes a first pixel, a second pixel, a third pixel, and a fourth pixel, the first pixel is located adjacent to the second pixel and the third pixel, and the fourth pixel is also located adjacent to the second pixel and the third pixel, the method comprising steps of:

obtaining four Y luminance values, one U chrominance value and one V chrominance value from the four pixels of the YUV format by an image processing device; and obtaining two R, two G and two B subpixel values of the RGB format according to the obtained four Y luminance values, one U-chrominance value and one V chrominance value by the image processing device, wherein the step of obtaining the two R, the two G and the two B subpixel values of the RGB format comprises steps of:

calculating the R subpixel value of the first pixel in the RGB format according to the Y luminance value of the first pixel in the YUV format, calculating the G subpixel value of the second pixel in the RGB format according to the Y luminance value of the second pixel in the YUV format, calculating the G subpixel value of the third pixel in the RGB format according to the Y luminance value of the third pixel in the YUV format, calculating the B subpixel value of the fourth pixel in the RGB format according to the Y luminance value of the fourth pixel in the YUV format, calculating the B subpixel value of the first pixel in the RGB format according to the U chrominance value of the first pixel in the YUV format and an average of the R subpixel value of the first pixel and the G subpixel value of the third pixel in the RGB format, and calculating the R subpixel value of the fourth pixel in the RGB format according to the V chrominance value of the first pixel in the YUV format and an average of the G subpixel value of the second pixel and the B subpixel value of the fourth pixel in the RGB format.

2. The method according to claim 1, wherein the R subpixel value of the first pixel is equal to the Y luminance value of the first pixel minus 16 and then multiplied by 1.1644, the G subpixel value of the second pixel is equal to the Y luminance value of the second pixel minus 16 and then multiplied by 1.1644, the G subpixel value of the third pixel is equal to the Y luminance value of the third pixel minus 16 and then multiplied by 1.1644, the B subpixel value of the fourth pixel is equal to the Y luminance value of the fourth pixel minus 16 and then multiplied by 1.1644, the B subpixel value of the first pixel is equal to the U chrominance value of the first pixel minus 128 and multiplied by 2.2768, and then added with the average of the R subpixel value of the first pixel and the G subpixel value of the third pixel, and the R subpixel value of the fourth pixel is equal to the V chrominance value of the first pixel minus 128 and multiplied by 2.2768, and then added with the average of the G subpixel value of the second pixel and the B subpixel value of the fourth pixel.

3. A mapping circuit to convert a YUV format to a RGB format applied in depacking a depth frame, wherein one pixel in the YUV format includes Y luminance, U chrominance and V chrominance, and one pixel in the RGB format includes a R subpixel, a G subpixel and a B subpixel, the depth frame in YUV format include at least four adjacent pixels in one group and the Y luminance, U chrominance and V chrominance of each pixel are arranged in vertical, theses four pixels in each group includes a first pixel, a second pixel, a third pixel, and a fourth pixel, the first pixel is located adjacent to the second pixel and the third pixel, and the fourth pixel is also located adjacent to the second pixel and the third pixel, the circuit comprising:

a pixel retrieving unit to retrieve four Y luminance values, one U chrominance value and one V chrominance value from the four pixels of the YUV format; and a pixel converting unit to obtain two R, two G and two B subpixel values of the RGB format according to the obtained four Y luminance values, one U-chrominance value and one V chrominance value, wherein, of four pixels in the RGB format, the pixel converting unit is configured to calculate the R subpixel value of the first pixel in the RGB format according to the Y luminance value of the first pixel in the YUV format, the pixel converting unit is configured to calculate the G subpixel value of the second pixel in the RGB format according to the Y luminance value of the second pixel in the YUV format, the pixel converting unit is configured to calculate the G subpixel value of the third pixel in the RGB format according to the Y luminance value of the third pixel in the YUV format, the pixel converting unit is configured to calculate the B subpixel value of the fourth pixel in the RGB format according to the Y luminance value of the fourth pixel in the YUV format, the pixel converting unit is configured to calculate the B subpixel value of the first pixel in the RGB format according to the U chrominance value of the first pixel in the YUV format and an average of the R subpixel value of the first pixel and the G subpixel value of the third pixel in the RGB format, and the pixel converting unit is configured to calculate the R subpixel value of the fourth pixel in the RGB format according to the V chrominance value of the first pixel in the YUV format and an average of the G subpixel value of the second pixel and the B subpixel value of the fourth pixel in the RGB format.

4. The circuit according to claim 3, wherein the R subpixel value of the first pixel is equal to the Y luminance value of the first pixel minus 16 and then multiplied by 1.1644, the G subpixel value of the second pixel is equal to the Y luminance value of the second pixel minus 16 and then multiplied by 1.1644, the G subpixel value of the third pixel is equal to the Y luminance value of the third pixel minus 16 and then multiplied by 1.1644, the B subpixel value of the fourth pixel is equal to the Y luminance value of the fourth pixel minus 16 and then multiplied by 1.1644, the B subpixel value of the first pixel is equal to the U chrominance value of the first pixel minus 128 and multiplied by 2.2768, and then added with the average of the R subpixel value of the first pixel and the G subpixel value of the third pixel, and the R subpixel value of the fourth pixel is equal to the V chrominance value of the first pixel minus 128 and multiplied by 2.2768, and then added with the average of the G subpixel value of the second pixel and the B subpixel value of the fourth pixel.

5. A mapping method applied in depacking a depth frame to convert from YUV format to RGB format, wherein one pixel in the YUV format includes Y luminance, U chrominance and V chrominance, and one pixel in the RGB format includes R subpixel, G subpixel and B subpixel, the depth frame in YUV format include at least four adjacent pixels in one group, and the Y luminance, U chrominance and V chrominance of each pixel are arranged in vertical, theses four pixels in each group includes a first pixel, a second pixel, a third pixel, and a fourth pixel, the first pixel is located adjacent to the second pixel and the third pixel, and the fourth pixel is also located adjacent to the second pixel and the third pixel, the method comprising steps of:

obtaining four Y luminance value, one U chrominance value and one V chrominance value from the four pixels of the YUV format by an image processing device; and obtaining two R, two G and two B subpixel values of the RGB format according to the obtained four Y luminance value, one U chrominance value and one V chrominance value by the image processing device, wherein the step of obtaining the two R the two G and the two B subpixel values of the RGB format comprises steps of:

calculating the R subpixel value of the first pixel in the RGB format according to the Y luminance value of the first pixel in the YUV format, calculating the G subpixel value of the second pixel in the RGB format according to the Y luminance value of the second pixel in the YUV format, calculating the G subpixel value of the third pixel in the RGB format according to the Y luminance value of the third pixel in the YUV format, calculating the B subpixel value of the fourth pixel in the RGB format according to the Y luminance value of the fourth pixel in the YUV format, calculating the B subpixel value of the first pixel in the RGB format according to the U chrominance value of the first pixel in the YUV format and an average of the R subpixel value of the first pixel and the G subpixel value of the second pixel in the RGB format, and calculating the R subpixel value of the fourth pixel in the RGB format according to the V chrominance value of the first pixel in the YUV format and an average of the G subpixel value of the third pixel and the B subpixel value of the fourth pixel in the RGB format.

6. The method according to claim 5, wherein the R subpixel value of the first pixel is equal to the Y luminance value of the first pixel minus 16 and then multiplied by 1.1644, the G subpixel value of the second pixel is equal to the Y luminance value of the second pixel minus 16 and then multiplied by 1.1644, the G subpixel value of the third pixel is equal to the Y luminance value of the third pixel minus 16 and then multiplied by 1.1644, the B subpixel value of the fourth pixel is equal to the Y luminance value of the fourth pixel minus 16 and then multiplied by 1.1644, the B subpixel value of the first pixel is equal to a value of an inverse function of the U chrominance value of the first pixel and then added with the average of the R subpixel value of the first pixel and the G subpixel value of the second pixel, and the R subpixel value of the fourth pixel is equal to a value of an inverse function of the V chrominance value of the first pixel and then added with the average of the G subpixel value of the third pixel and the B subpixel value of the fourth pixel.

7. A mapping circuit to convert a YUV format to a RGB format applied in depacking a depth frame, wherein one pixel in the YUV format includes Y luminance, U chrominance and V chrominance, and one pixel in the RGB format includes R subpixel, G subpixel and B subpixel, the depth frame in YUV format include at least four adjacent pixels in one group, and the Y luminance, U chrominance and V chrominance of each pixel are arranged in vertical, theses four pixels in each group includes a first pixel, a second pixel, a third pixel, and a fourth pixel, the first pixel is located adjacent to the second pixel and the third pixel, and the fourth pixel is also located adjacent to the second pixel and the third pixel, the circuit comprising:

a pixel retrieving unit to retrieve four Y luminance value, one U chrominance value and one V chrominance value from the four pixels of the YUV format; and a pixel converting unit to obtain two R, two G and two B subpixel values of the RGB format according to the obtained four Y luminance value, one U chrominance value and one V chrominance value, wherein, of four pixels in the RGB format, the pixel converting unit is configured to calculate the R subpixel value of the first pixel in the RGB format according to the Y luminance value of the first pixel in the YUV format, the pixel converting unit is configured to calculate the G subpixel value of the second pixel in the RGB format according to the Y luminance value of the second pixel in the YUV format, the pixel converting unit is configured to calculate the G subpixel value of the third pixel in the RGB format according to the Y luminance value of the third pixel in the YUV format, the pixel converting unit is B subpixel value of the fourth pixel in the RGB format according to the Y luminance value of the fourth pixel in the YUV format, the pixel converting unit is configured to calculate the B subpixel value of the first pixel in the RGB format according to the U chrominance value of the first pixel in the YUV format and an average of the R subpixel value of the first pixel and the G subpixel value of the second pixel in the RGB format, and the pixel converting unit is configured to calculate the R subpixel value of the fourth pixel in the RGB format according to the V chrominance value of the first pixel in the YUV format and an average of the G subpixel value of the third pixel and the B subpixel value of the fourth pixel in the RGB format.

8. The circuit according to claim 3, wherein the R subpixel value of the first pixel is equal to the Y luminance value of the first pixel minus 16 and then multiplied by 1.1644, the G subpixel value of the second pixel is equal to the Y luminance value of the second pixel minus 16 and then multiplied by 1.1644, the G subpixel value of the third pixel is equal to the Y luminance value of the third pixel minus 16 and then multiplied by 1.1644, the B subpixel value of the fourth pixel is equal to the Y luminance value of the fourth pixel minus 16 and then multiplied by 1.1644. The B subpixel value of the first pixel is equal to a value of an inverse function of the U chrominance value of the first pixel and then added with the average of the R subpixel value of the first pixel and the G subpixel value of the second pixel, and the R subpixel value of the fourth pixel is equal to a value of an inverse function of the V chrominance value of the first pixel and then added with the average of the G subpixel value of the third pixel and the B subpixel value of the fourth pixel.

9. The method according to claim 2, wherein the B subpixel value of the first pixel is equal to a nonlinear transform of the U chrominance value and then added with the average of the R subpixel value of the first pixel and the G subpixel value of the third pixel, and the R subpixel value of the fourth pixel is equal to the nonlinear transform of the V chrominance value and then added with the average of the G subpixel value of the second pixel and the B subpixel value of the fourth pixel.

10. The method according to claim 9, wherein each of the nonlinear transforms of the U chrominance value and the V chrominance value is a piece-wise transform of the U chrominance value and the V chrominance value; if the U or V chrominance value is in the range of {16, 123}, the corresponding transformed value is equal to the U or V chrominance value minus 123, multiplied by 2.3364, and minus 5; if the U or V chrominance value is in the range of {123, 133}, the corresponding transformed value is equal to the U or V chrominance value minus 128; and if the U or V chrominance value is in the range of {133, 240}, the corresponding transformed value is equal to the chrominance value minus 133, multiplied by 2.3364, and plus 5.

11. The method according to claim 4, wherein the B subpixel value of the first pixel is equal to a nonlinear transform of the U chrominance value and then added with the average of the R subpixel value of the first pixel and the G subpixel value of the third pixel, and the R subpixel value of the fourth pixel is equal to a nonlinear transform of the V chrominance value and then added with the average of the G subpixel value of the second pixel and the B subpixel value of the fourth pixel.

12. The method according to claim 11, each of the nonlinear transform of the U chrominance value and V chrominance value is a piece-wise transform of the chrominance value; if the U or V chrominance value is in the range of {16, 123}, the corresponding transformed value is equal to the chrominance value minus 123, multiplied by 2.3364, and minus 5; if the U or V chrominance value is in the range of {123, 133}, the corresponding transformed value is equal to the chrominance value minus 128; and if the U or V chrominance value is in the range of {133, 240}, the corresponding transformed value is equal to the chrominance value minus 133, multiplied by 2.3364, and plus 5.

13. An inverse mapping method applied in packing a depth frame to convert from RGB format to YUV format, wherein one pixel in the RGB format includes a R subpixel, a G subpixel and a B subpixels, and the one pixel in the YUV format includes Y luminance, U chrominance and V chrominance, the depth frame in RGB format include at least four adjacent pixels in one group, and the R subpixel, G subpixel and B subpixel of each pixel are arranged in vertical, these four pixels in each group includes a first pixel, a second pixel, a third pixel, and a fourth pixel, and the first pixel is located adjacent to the second pixel and the third pixel, and the fourth pixel is also located adjacent to the second pixel and the third pixel, the method comprises following steps of:

obtaining two R, two G and two B subpixel values having interleaved positions from the four pixels of the RGB format by an image processing device; and obtaining four Y-luminance value, one U-chrominance value and one V-chrominance value of the YUV format according to the obtained two R, two G, and two B subpixel values by the image processing device, wherein the step of obtaining four Y-luminance value, one U-chrominance value and one V-chrominance value of the YUV format comprises steps of:

calculating the Y luminance value of the first pixel in the YUV format according to the R subpixel value of the first pixel in the RGB format, calculating the Y luminance value of the second pixel in the YUV format according to the G subpixel value of the second pixel in the RGB format, calculating the Y luminance value of the third pixel in the YUV format according to the G subpixel value of the third pixel in the RGB format, calculating the Y luminance value of the fourth pixel in the YUV format according to the B subpixel value of the fourth pixel in the RGB format, calculating the U chrominance value of the first pixel in the YUV format according to subtracting the B subpixel value of the first pixel in the RGB format to an average of the R subpixel value of the first pixel and the G subpixel value of the third pixel in the RGB format, and calculating the V-chrominance value of the first pixel in the YUV format according to subtracting the R subpixel value of the fourth pixel in the RGB format and an average of the G subpixel value of the second pixel and the B subpixel value of the fourth pixel in the RGB format.

* * * * *